(12) United States Patent
Garrity et al.

(10) Patent No.: US 9,882,507 B2
(45) Date of Patent: Jan. 30, 2018

(54) POWER FACTOR ADJUSTMENT IN MULTI-PHASE POWER SYSTEM

(71) Applicant: SolarCity Corporation, San Mateo, CA (US)

(72) Inventors: Paul Garrity, Rockwall, TX (US); Aaron M. Jungreis, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 598 days.

(21) Appl. No.: 14/019,470

(22) Filed: Sep. 5, 2013

(65) Prior Publication Data

US 2014/0306543 A1    Oct. 16, 2014

Related U.S. Application Data

(60) Provisional application No. 61/812,694, filed on Apr. 16, 2013.

(51) Int. Cl.
*H02J 3/18* (2006.01)
*H02M 7/44* (2006.01)
*H02J 3/38* (2006.01)

(52) U.S. Cl.
CPC ............. *H02M 7/44* (2013.01); *H02J 3/18* (2013.01); *H02J 3/38* (2013.01); *Y02E 40/30* (2013.01); *Y10T 307/707* (2015.04)

(58) Field of Classification Search
CPC ..... H02M 7/44; H02J 3/18; H02J 3/38; Y10T 307/707; Y02E 40/30

(Continued)

(56) References Cited

U.S. PATENT DOCUMENTS

| 2,367,925 A | 1/1945 | Brown |
| 4,104,687 A | 8/1978 | Zulaski |

(Continued)

FOREIGN PATENT DOCUMENTS

| CN | 101895127 A | 11/2010 |
| DE | 3236071 | 1/1984 |

(Continued)

OTHER PUBLICATIONS

Portions of prosecution history of U.S. Appl. No. 13/310,691, Feb. 6, 2013, Garrity, Paul, et al.

(Continued)

*Primary Examiner* — Daniel Kessie
(74) *Attorney, Agent, or Firm* — Kilpatrick Townsend & Stockton LLP

(57) ABSTRACT

A multi-phase power generation system for renewable energy, in which reactive elements (i.e., capacitors and/or inductors) can be selectively switched in and out in order to meet a particular power factor requirement, is provided. Each phase of the multi-phase power system receives generated powers from a set of inverters, and each phase has a set of switch reactive elements for making power factor adjustments to the power generated by the set of inverters. The power outputs of the set of inverters belonging to a particular phase are combined into a one combined ac power output, and the power factor adjustment for that particular phase is performed on the combined power output by the set of the switch reactive elements of that particular phase. In some embodiments, at least some of the inverters are micro-inverters that convert DC power from one or two solar panels to AC power.

18 Claims, 24 Drawing Sheets

(58) Field of Classification Search
USPC .......................................................... 307/82
See application file for complete search history.

(56) References Cited

U.S. PATENT DOCUMENTS

| | | | |
|---|---|---|---|
| 4,321,581 A | 3/1982 | Tappeiner et al. | |
| 4,453,207 A | 6/1984 | Paul | |
| 4,545,997 A | 10/1985 | Wong et al. | |
| 4,554,502 A | 11/1985 | Rohatyn | |
| 4,626,983 A | 12/1986 | Harada et al. | |
| 4,683,529 A | 7/1987 | Bucher, II | |
| 4,772,994 A | 9/1988 | Harada et al. | |
| 5,329,222 A | 7/1994 | Gyugyi et al. | |
| 5,576,941 A | 11/1996 | Nguyen et al. | |
| 5,734,565 A | 3/1998 | Mueller et al. | |
| 5,814,970 A | 9/1998 | Schmidt | |
| 5,859,772 A | 1/1999 | Hilpert | |
| 6,219,623 B1 | 4/2001 | Wills | |
| 6,429,546 B1 | 8/2002 | Ropp et al. | |
| 6,933,714 B2 | 8/2005 | Fasshauer et al. | |
| 7,061,211 B2 | 6/2006 | Satoh et al. | |
| 7,095,597 B1 | 8/2006 | Cousineau | |
| 7,142,997 B1 | 11/2006 | Widner | |
| 8,310,101 B2 | 11/2012 | Amaratunga et al. | |
| 8,391,032 B2 | 3/2013 | Garrity et al. | |
| 8,648,498 B1* | 2/2014 | West ....................... | H02J 3/383 307/82 |
| 2002/0180408 A1 | 12/2002 | McDaniel et al. | |
| 2004/0164718 A1 | 8/2004 | McDaniel et al. | |
| 2005/0179420 A1 | 8/2005 | Satoh et al. | |
| 2008/0291707 A1 | 11/2008 | Fang | |
| 2008/0304296 A1 | 12/2008 | NadimpalliRaju et al. | |
| 2009/0283129 A1 | 11/2009 | Foss | |
| 2010/0001698 A1* | 1/2010 | Johnson ................ | H02J 3/1864 323/209 |
| 2010/0246226 A1 | 9/2010 | Ku et al. | |
| 2010/0309695 A1 | 12/2010 | Fornage | |
| 2010/0332047 A1* | 12/2010 | Arditi ....................... | H02J 3/18 700/298 |
| 2011/0205766 A1 | 8/2011 | Rodriguez | |
| 2012/0057520 A1 | 3/2012 | Mumtaz | |
| 2012/0098336 A1 | 4/2012 | Gurunathan et al. | |
| 2013/0257164 A1 | 10/2013 | Garrity et al. | |
| 2014/0191583 A1* | 7/2014 | Chisenga .................. | H02J 1/10 307/82 |

FOREIGN PATENT DOCUMENTS

| | | |
|---|---|---|
| DE | 20 2010 006 020 U1 | 10/2011 |
| EP | 0576271 | 12/1993 |
| EP | 1187291 | 3/2002 |
| EP | 2 164 147 A2 | 3/2010 |
| GB | 2415841 | 1/2006 |
| GB | 2497275 | 6/2013 |
| JP | 2004-312994 | 11/2004 |
| WO | WO 2006/048688 | 5/2006 |
| WO | WO 2007/080429 | 7/2007 |
| WO | WO 2013/076451 | 5/2013 |

OTHER PUBLICATIONS

Portions of prosecution history of U.S. Appl. No. 13/769,275, Oct. 28, 2013, Enecsys Limited.
Portions of prosecution history of GB 1120367.6, dated Apr. 9, 2013, Enecsys Limited.
International Search Report and Written Opinion for PCT/GB2012/052570, dated Feb. 27, 2013, Enecsys Limited.
Author Unknown, "DC Combiner Box Enables Better Awareness for Active Management," SolarMagic DC Monitoring Combiner Box Specifications, Apr. 2011, 2 pages, National Semiconductor Corporation.
Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.
Cordonnier, Charles-Edouard, et al., "Application Considerations for Sensefet Power Mosfet Devices," PCI Proceedings, May 11, 1987, pp. 47-65.
Marra, Enes Gonçalves et al., "Self-Excited Induction Generator Controlled by a VS-PWM Converter Providing High Power-Factor Current to a Single-Phase Grid," Proceedings of the 24$^{th}$ Annual Conference of IEEE, Aug. 31-Sep. 4, 1998, pp. 703-708, vol. 2, IEEE.
Naik, R., et al., "A Novel Grid Interface for Photovoltaic, Wind-Electric, and Fuel-Cell Systems with a Controllable Power Factor of Operation," Applied Power Electronics Conference and Exposition, Mar. 5-9, 1995, pp. 995-998, IEEE.
Petkanchin, L., "Processes Following Changes of Phase Angle Between Current and Voltage in Electric Circuits," IEEE Power Engineering Review, Aug. 1999, pp. 59-60, vol. 19, Issue 8, IEEE.
Rodriguez, C., et al., "Dynamic Stability of Grid-Connected Photovoltaic Systems," Power Engineering Society General Meeting, Jun. 6-10, 2004, 7 pages, IEEE.
International Search Report and Written Opinion for PCT/GB2005/050197, dated Feb. 14, 2006, Enecsys Limited.
International Preliminary Report on Patentability for PCT/GB2005/050197, May 8, 2007 (issuance date), Enecsys Limited.
International Preliminary Report on Patentability for PCT/GB2012/052570, dated Jun. 5, 2014, Enecsys Limited.
Calais, Martina, et al., "Inverters for Single-Phase Grid Connected Photovoltaic Systems—Overview and Prospects," Proceedings of the 17th European Photovoltaic Solar Energy Conference, Oct. 22-26, 2001, pp. 437-440, Munich, Germany.
Office Action dated Sep. 23, 2016 for related Chinese Application No. 201480034351.2, 6 pages.
International Search Report dated Aug. 6, 2014 for International Patent Application No. PCT/GB2014/051135, 4 pages.
Written Opinion dated Aug. 6, 2014 for International Patent Application No. PCT/GB2014/051135, 3 pages.

* cited by examiner $P_I$ = phase of AC current $P_V$ = phase of AC voltage
or target phase for AC current Current Leading Voltage
(prior to any switch-in)

Switch-in enough
inductors to overshoot
target phase

Fine tune by
switching in capacitors

POWER FACTOR ADJUSTMENT IN MULTI-PHASE POWER SYSTEM

CLAIM OF BENEFIT TO PRIOR APPLICATIONS

This application claims the benefit of U.S. Provisional Application 61/812,694, filed Apr. 16, 2013, which is incorporated herein by reference.

BACKGROUND

In electric power transmission and distribution, volt-ampere reactive (VAR) is a unit used to measure reactive power in an AC electric power system. Reactive power exists in an AC circuit when the current and voltage are not changing at the same time. VAR power refers to an imaginary component of the total power supplied by a power generation system, resulting from driving a reactive load such that the current and voltage are out of phase with one another. Driving an inductive load causes the current to lag the voltage, and vice versa for a capacitive load.

Thus the reactive component of power can be compensated by adding capacitance/inductance as needed. The degree of reactive power is specified by displacement power factor $Cos(\Phi)$, where $\Phi$ is the phase angle between the current and the voltage. Conventionally, capacitors are considered to generate reactive power and inductors to consume it. If a capacitor and an inductor are placed in parallel, then the currents flowing through the inductor and the capacitor tend to cancel rather than add. This is the fundamental mechanism for controlling the power factor (VAR control) in electric power transmission; capacitors (or inductors) are inserted in a circuit to partially cancel reactive power 'consumed' by the load.

VAR control is required where grid requirements mandate leading or lagging control over the output of any grid connected power source. New grid requirements are being imposed in regions where power generation from renewable sources, in particular solar, is becoming a larger proportion of total power generation. In particular these place requirements on VAR control for reactive power correction where differing sources supplying power to the grid could otherwise force the grid into an under-excited or over-excited mode during peak and off-peak cycles of the overall system. Thus, for example, the ability to absorb or export VLRs is required by new standards in Germany, in particular VDE4105, which will be mandatory for new products from January 2012. Thus the ability to react and correct and/or actively damp VARs is highly desirable.

SUMMARY

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Some embodiments of the invention provide a multi-phase power generation system for renewable energy, in which reactive elements (i.e., capacitors and/or inductors) can be selectively switched in and out in order to meet a particular power factor requirement. In some embodiments, each phase of the multi-phase power system receives generated powers from a set of inverters, and each phase has a set of switch reactive elements for making power factor adjustments to the power generated by the set of inverters belonging to that particular phase of the multi-phase system. In some embodiments, the power outputs of the set of inverters belonging to a particular phase are combined into a one combined ac power output, and the power factor adjustment for that particular phase is performed on the combined power output by the set of the switch reactive elements of that particular phase. In some embodiments, at least some of the inverters are micro-inverters that convert DC electricity from one or two solar panels to AC power.

In some embodiments, the inductors in the set of switch inductors are sized such they provide maximum inductive power factor correction possibly required. In some embodiments, the total capacitance in a set of switch capacitors of is adequate to provide maximum required power factor correction (e.g. 90%) on the maximum rated power of the system (e.g. 12 kW).

In some embodiments, the smallest capacitors values in the set of capacitors provides adequate resolution in power factor change at lowest required operating power (e.g. 5% of minimum required full system power level). In some embodiments, the capacitances of the largest capacitors are varied such that their capacitances are factors of power of two from each other. In some embodiments, at least some of the capacitors in the set are valued such that the sum of all capacitor values smaller than a given capacitor exceeds that given capacitor value. In some embodiments, the smallest of the "large" capacitors is smaller than the sum of all of the "small" capacitor values.

Some embodiments provide an algorithm for determining which capacitors and/or inductors to switch-in or switch-out from the set of switch capacitors and/or the set of switch inductors. The algorithm first calculates the required capacitance to obtain the target power factor value with the given load. If the required capacitance is a negative number, the algorithm decides which inductors to switch into the circuit and then calculates the balance of capacitance to switch into the circuit. For large capacitors, the algorithm in some embodiments selects a capacitor for switch-in if it is the largest capacitor that is less than the required capacitance. For small capacitors, the algorithm in some embodiments examines every combination of capacitors to determine which combination reproduces the target value of capacitance with the smallest error.

In some embodiments, a system controller controls the multi-phase power supply system. In some embodiments, the system controller is a gateway controller to the multi-phase power generation system, through which the user can monitor and control the operations of the system. In some embodiments, the system controller also coordinates the power generation operations between the different phases of the multi-phase system. In some embodiments, the system controller gathers power output readings from each of the micro-inverters in the system and performs balancing of power output level between the different phases. The VAR control of each phase then uses the balanced power output level to correct the power factor for that phase.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
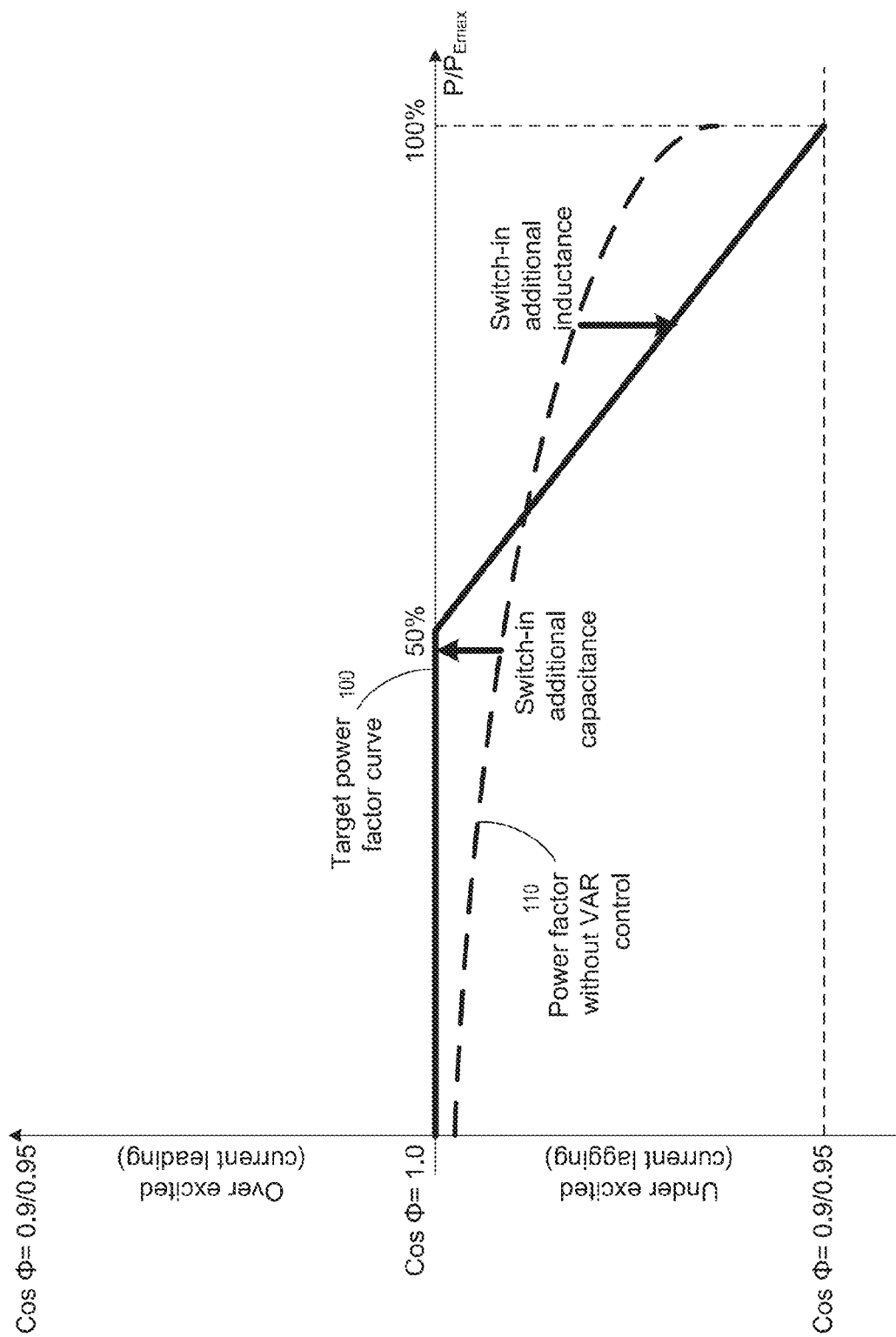
FIG. 1 illustrates an example power factor plot that includes a grid requirement curve for performing power factor compensation.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a multi-phase power generation system for renewable energy, in which reactive elements (i.e., capacitors and/or inductors) can be selectively switched in and out in order to meet a particular power factor requirement. In some embodiments, each phase of the multi-phase power system receives generated powers from a set of inverters, and each phase has a set of switch reactive elements for making power factor adjustments to the power generated by the set of inverters belonging to that particular phase of the multi-phase system. In some embodiments, the power outputs of the set of inverters belonging to a particular phase are combined into a one combined ac power output, and the power factor adjustment for that particular phase is performed on the combined power output by the set of the switch reactive elements of that particular phase. In some embodiments, at least some of the inverters are micro-inverters that convert DC power from one or two solar panels to AC power.

In some embodiments of the power generation system, the system determines a fraction of a total maximum (rated) ac power output being provided by a set of inverter modules belonging to a particular phase of the multi-phase system at any one time. A controller in the system uses this information to determine the required reactance to switch-in for the ac outputs of that particular phase before sending control signals to the set of reactive elements to selectively switch-in or switch-out capacitors and/or inductors across the combined ac power output of the phase. The switching in/out of a capacitor/inductor may employ on/off control to switch the capacitor/inductor in or out, or may employ phase control, to control a proportion of an ac cycle for which the capacitor is switched in, to provide a variable degree of power factor adjustment or compensation.

I. Multi-Phase Power System with VAR Control

The power factor of an AC electrical power system is defined as the ratio of the real power flowing to the load, to the apparent power in the circuit. It is a dimensionless number between −1 and 1. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power will be greater than the real power. In linear circuits having only sinusoidal currents and voltages of one frequency, the power factor arises only from the difference in phase between the current and voltage. This is called "displacement power factor".

Displacement Power factor can be expressed as $\cos(\Phi)$, where $\Phi$ is the phase angle between the current and the voltage. In some embodiments, displacement power factor is used to specify the reactive or VAR power. Power factor/reactive power compensation, or VAR control is required where grid requirements mandate leading or lagging control over the output of any grid connected power source. Some embodiments provide a power generation system that performs VAR control with switchable reactive elements in accordance with a grid requirement that calls for specific power factors at different levels of ac power output by the power generation system.

FIG. 1 illustrates an example power factor plot that includes a grid requirement curve 100, based on which some embodiments perform VAR control or power factor compensation. The grid requirement curve 100 is plotted over a vertical axis and a horizontal axis. The horizontal axis, labeled "$P/P_{Emax}$", indicates the ratio of the power output level of the power source (P) over the maximum rated power of the power source ($P_{Emax}$). The vertical axis, labeled $\cos(\Phi)$, indicates the power factor at a particular power level ratio, where $\Phi$ is the phase difference between AC current and the AC voltage. The center position of the vertical axis correspond to $\Phi=0$ or power factor $\cos(\Phi)=1.0$ (unity power factor). This indicates zero difference between the phase of the AC current and the phase of the AC voltage (i.e., $\Phi$ is positive). Power factors above $\cos(\Phi)=1.0$ correspond to an over-excited load in which the current leads the voltage. Power factors below $\cos(\Phi)=1.0$ correspond to an under-excited load in which the current lags the voltage (i.e., $\Phi$ is negative).

In some embodiments, the requirement curve 100 corresponds to VDE4105 requirement in which the power factor of a power generation system outputting power above 3.68 kVA must be continuously controlled based on a percentage of full load system power. For a power source that is above 13.8 kVA, the power factor is required to be at 1.0 (i.e., $\Phi=0$) when power level ratio $P/P_{Emax}$ is between 0% and 50%. The curve 100 starts to bend after 50% power level ratio, linearly toward $\cos(\Phi)=0.9$ under-excited (i.e., current lagging) at 100% power level ratio. For a power source that is below 13.8 kVA, the curve 100 starts to bend after 50% power level ratio, linearly toward $\cos(\Phi)=0.95$ under excited at 100% power level ratio.

FIG. 1 also illustrates an example power factor curve 110 of a power source without VAR control. The curve 110 plots the displacement power factor of the particular power source over the same range of $P/P_{Emax}$ (0%-100%). As illustrated, the example power factor curve 110 is "below" the grid requirement curve 100 at lower power levels and is "above" the grid requirement curve 100 at higher power levels. For example, at 50% power level ratio, the displacement power factor 110 is below the grid requirement 100. This indicates that the phase of the current is lagging the phase of the voltage by too much (or leading by too little). On the other hand, at 80% power level ratio, the displacement power factor 110 is above the grid requirement curve 100. This indicates that the phase of the current is leading the phase of the voltage by too much (or lagging by too little). In order for the power source to comply with the requirement of the grid, some embodiments would "move" the displacement power factor curve 110 closer toward the requirement curve 100 (i.e., using the requirement curve 100 as the "target" power factor curve) by performing VAR control. In some of these embodiments, the VAR control causes the system to switch-in more capacitance (or less inductance) when the power factor is below the requirement curve and to switch-in more inductance (or less capacitance) when the power factor is above the requirement curve.

Figure 2:
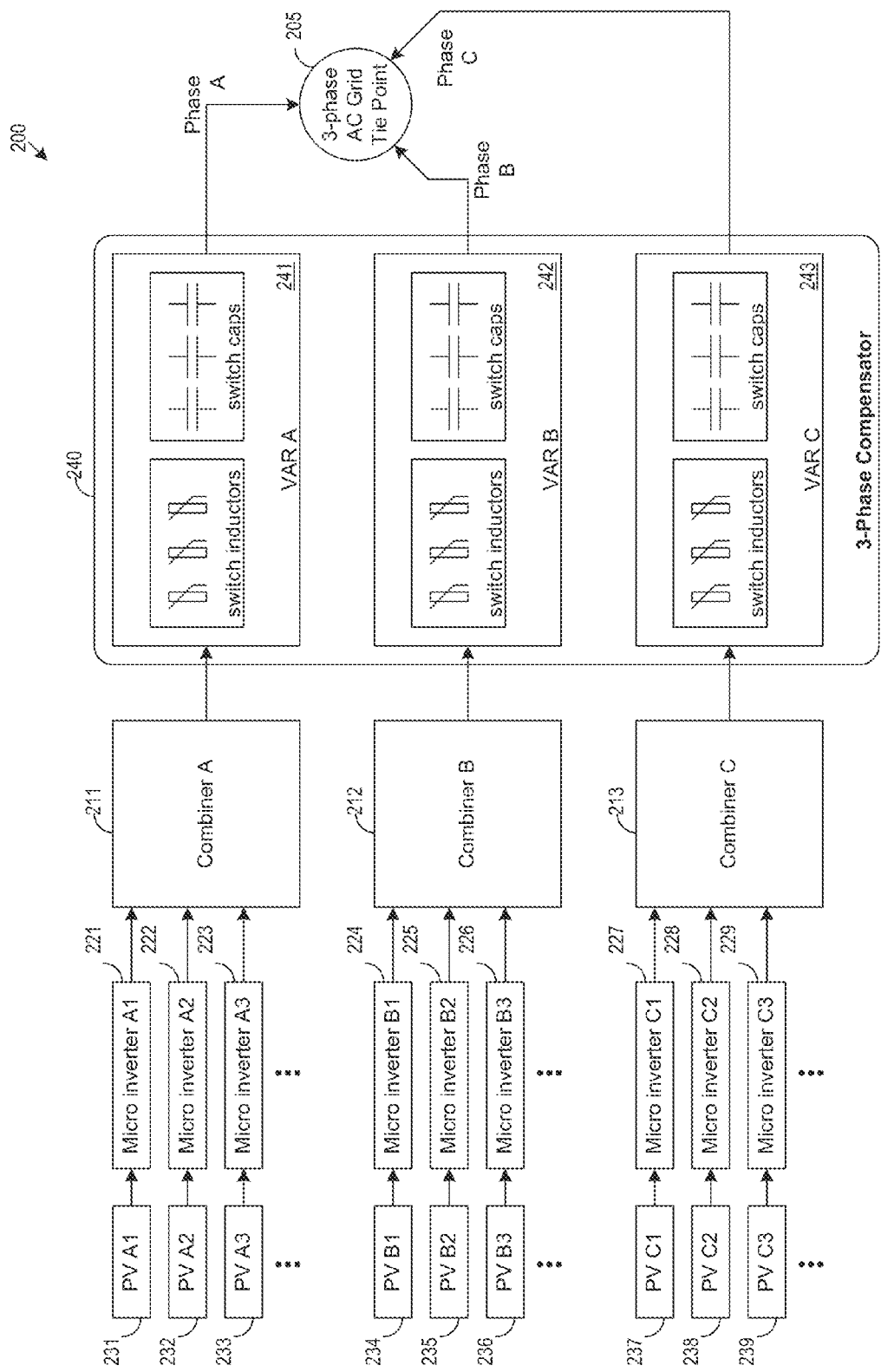
FIG. 2 illustrates a multi-phase power generation system that has a VAR control circuitry for each phase.

In some embodiments, VAR control as described above by reference to FIG. 1 is performed by each phase of a multi-phase power generation system. FIG. 2 illustrates a multi-phase power generation system 200, in which each phase of the power generation system has its own VAR control circuitry that performs VAR control on the power that is generated for that phase. Specifically, the multi-phase power generation system 200 is a three-phase generation system that produces three phases (phases A, B, and C) of AC power from three sets of inverters. Each set of inverters receives power from a set of DC power source. The power or current generated by the inverters of each particular phase is combined together by a combiner, and the combined power is passed to a VAR control unit for that phase. The VAR controlled power of each phase is then delivered to a 3-phase AC grid 205.

As illustrated, the multi-phase power generation system 200 includes three combiners 211-213. The combiner 211 is for producing a combined AC power for phase A by combining the AC powers generated by micro-inverters 221-223, which receive DC power from PV cells 231-233. Likewise, the combiner 212 is for producing a combined AC power for phase B by combining the AC powers generated by micro-inverters 224-226, which receive DC power from PV cells 234-236; the combiner 213 is for producing a combined AC power for phase C by combining the AC powers generated by micro-inverters 227-229, which receive DC power from PV cells 237-239.

The combined power produced for phase A by the combiner 211 is in turn sent to VAR controller 241, the combined power produced for phase B by the combiner 212 is sent to VAR controller 242, and the combined power produced for phase C by the combiner 213 is sent to VAR controller 243. The outputs of the three VAR controllers are then sent to the 3-phase AC grid tie point 205. In some embodiments, the three VAR control modules 241-243 are parts of a larger three-phase compensator 240.

PV cells 231-239 (or solar cells) are electrical devices that convert the energy of light directly into electricity by the photovoltaic effect without being attached to any external voltage source. The PV cells generate electrical power by converting solar radiation into DC current. In some embodiments, PV cells are part of solar panels composed of a number of solar cells. In some embodiments, the DC power of the PV cells are generated by photovoltaic semiconductor material such as monocrystalline silicon, polycrystalline silicon, amorphous silicon, cadmium telluride, copper indium gallium selenide/sulfide, or other materials.

Micro-inverters 221-229 convert DC power outputs of the PV cells 231-239 into AC power outputs. Each micro-inverter converts DC current from one or two solar panels to AC. The output from the micro-inverters are combined by combiners 211-213 and fed to the electrical grid 205. In some embodiments, each micro-inverter harvests optimum power by performing maximum power point tracking for its connected panel. Micro-inverters will be further described below by reference to FIGS. 4 and 5.

Each of the combiners 211-213 is for combining the AC power outputs of several micro-inverters. In some embodiments, multiple combiner boxes are employed to combine the power outputs of the micro-inverters for one particular phase. For example, the combiner 211 can include multiple combiner boxes for combining the power produced by the micro-inverters 231-233 for phase A of the three-phase system. Combiners will be further described below by reference to FIG. 6.

The VAR control modules (or reactive power compensators) 241-243 are for performing VAR control on the AC power produced for phase A, phase B, and phase C, respectively. Specifically, the VAR control module 241 receives the combined AC power for phase A from the combiner 211, the VAR control module 242 receives the combined AC power for phase B from the combiner 212, and the VAR control module 243 receives the combined AC power for phase C from the combiner 213. Each of the VAR control modules includes a set of switchable reactive elements (i.e., capacitors and inductors) for performing power factor adjustment or reactive power compensation as described earlier by reference to FIG. 1. In some embodiments, the set of switchable reactive elements in a VAR control module are organized into one or more banks.

In some embodiments, reactive elements (i.e., capacitors and inductors) in a VAR control module that are switched in are connected in parallel across the AC output of the VAR control module. In some embodiments, at least some of the reactive elements are in series connections with the AC output. The outputs of the VAR control modules 241, 242, and 243 are delivered to phase A, phase B, and phase C of the three-phase grid 205, respectively. VAR control modules will be further described below by reference to FIG. 7.

Figure 3:
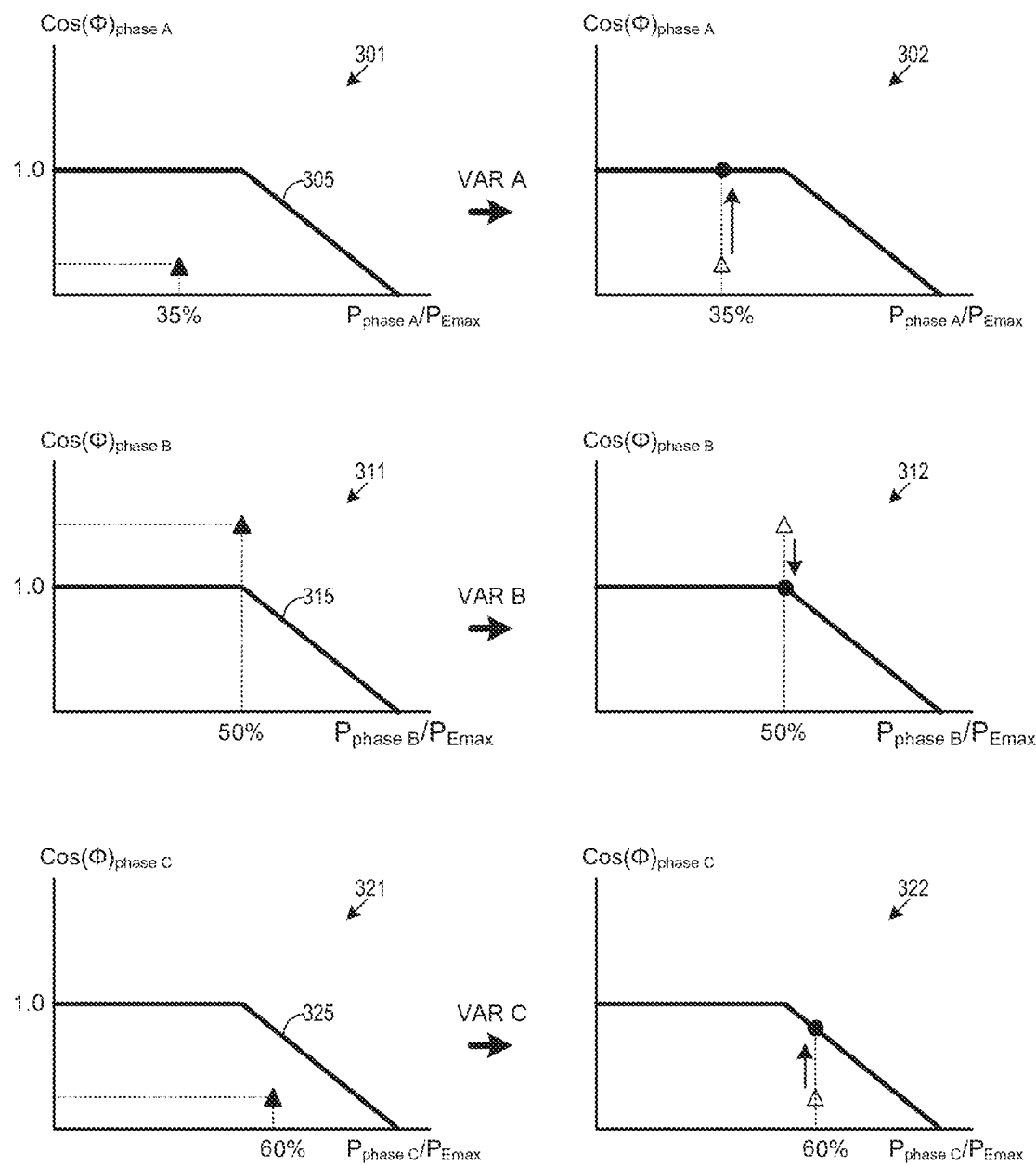
FIG. 3 illustrates an example power factor adjustment/VAR control operation by a three-phase power generation system.

In some embodiments, the VAR control module of a phase performs its power factor adjustment operations independently from other VAR control modules of other phases. Specifically, the VAR control module of a particular phase performs its VAR operation based only on the total power output level of that phase by using its own set of switchable reactive elements. FIG. 3 illustrates an example power factor adjustment/VAR control operation by the three-phase power generation system 200, in which each phase of the power generation system perform its own independent VAR control operations based on that phase's own power output level.

FIG. 3 illustrates three sets of power factor plots. Each power factor plot includes a grid requirement curve, which is also the target power factor curve for the power factor adjustment operation. Like the power factor graph of FIG. 1, each power factor graph is plotted over a horizontal axis of power level ratio ($P/P_{Emax}$) and a vertical axis of displacement power factor based on the phase angle ($\Phi$) between current and voltage.

The power factor plots 301-302 illustrates the power factor adjustment performed by the VAR control module 241 based on a grid requirement curve 305 for phase A. As illustrated in the power factor plot 301 by the solid triangle, phase A's power level is at 35% of the rated maximum, while its displacement power factor is below the requirement curve 305. The power factor plot 302 shows the result of the power factor adjustment performed by the VAR control module 241, in which the power factor of phase A at 35% of the rated maximum has been moved to near or at the grid requirement curve 305 (illustrated by the solid circle). The VAR control module 241 in some embodiments accomplishes this by switching in additional capacitors.

The power factor plots 311-312 illustrates the power factor adjustment performed by the VAR control module 242 based on a grid requirement curve 315 for phase B. As illustrated in the power factor plot 311 by the sold triangle, phase B's power level is at 50% of the rated maximum, while its displacement power factor is above the requirement curve 315. The power factor plot 312 shows the result of the power factor adjustment performed by the VAR control module 242, in which the power factor of phase B at 50% of the rated maximum has been moved to near or at the grid requirement curve 315 (illustrated by the solid circle). The VAR control module 242 in some embodiments accomplishes this by switching in additional inductors.

The power factor plots 321-322 illustrates the power factor adjustment performed by the VAR control module 243 based on a grid requirement curve 325 for phase C. As illustrated in the power factor plot 321 by the sold triangle, phase C's power level is at 60% of the rated maximum, while its displacement power factor is below the requirement curve 325. The power factor plot 313 shows the result of the power factor adjustment performed by the VAR control module 243, in which the power factor of phase C at 60% of the rated maximum has been moved to near or at the grid requirement curve 325 (illustrated by the solid circle). The VAR control module 243 in some embodiments accomplishes this by switching in additional capacitors.

As mentioned, the AC power that requires VAR control originates from a set of micro-inverters, which converts DC power received from PV cells in solar panels into AC power. In some embodiments, individual micro-inverters do not include switchable reactive elements for performing VAR control operations, and the power generation system instead rely on VAR control modules that perform power factor adjustment on the combined power outputs of the set of micro-inverters. In the example multi-phase power generation system 200 of FIG. 2, the VAR is performed by the VAR modules 241-243 rather than in the micro-inverters 221-229.

Figure 4A:
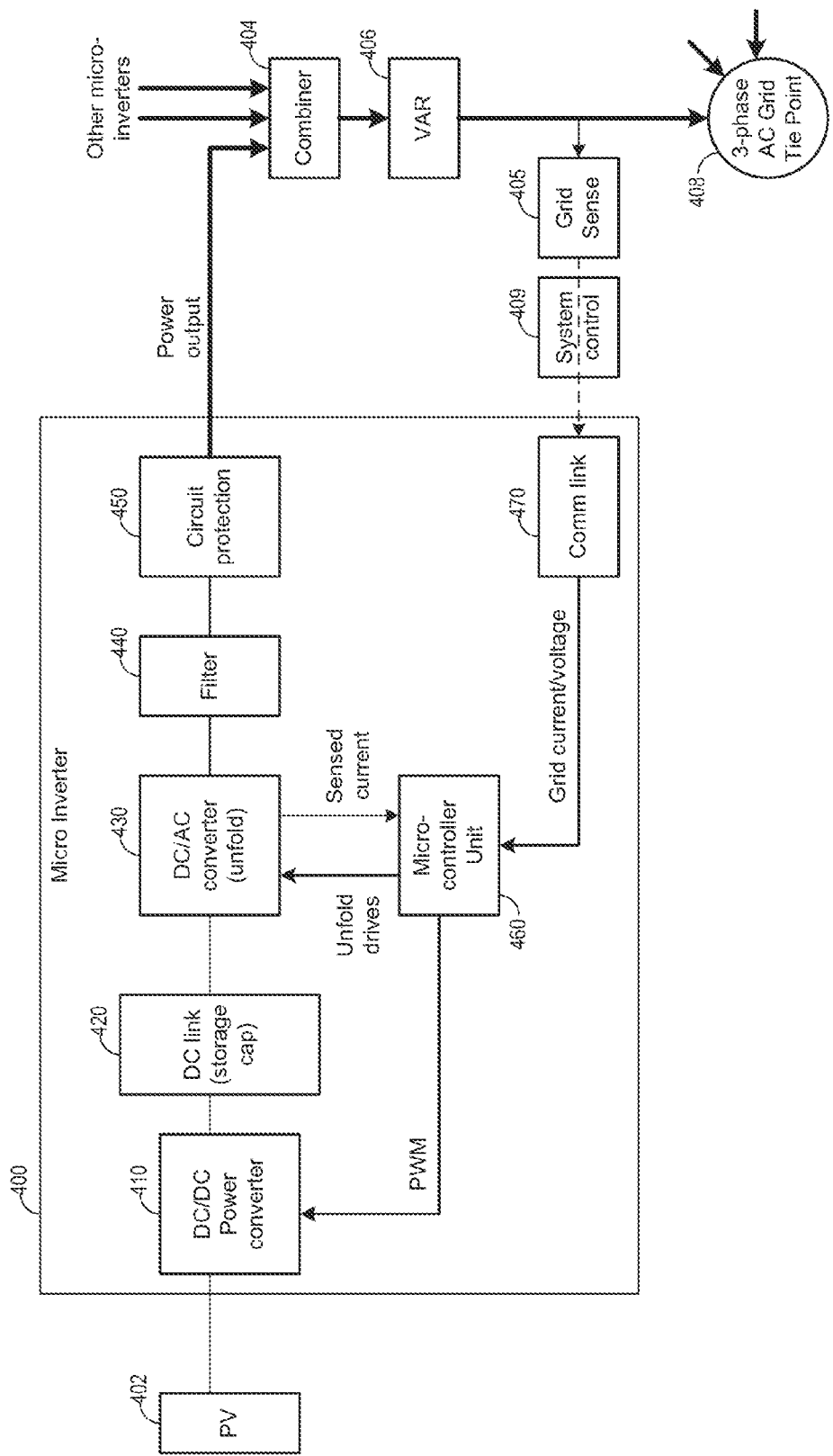
FIGS. 4a-b illustrates a micro-inverter that does not include switchable reactive elements for performing VAR control.
Figure 4B:
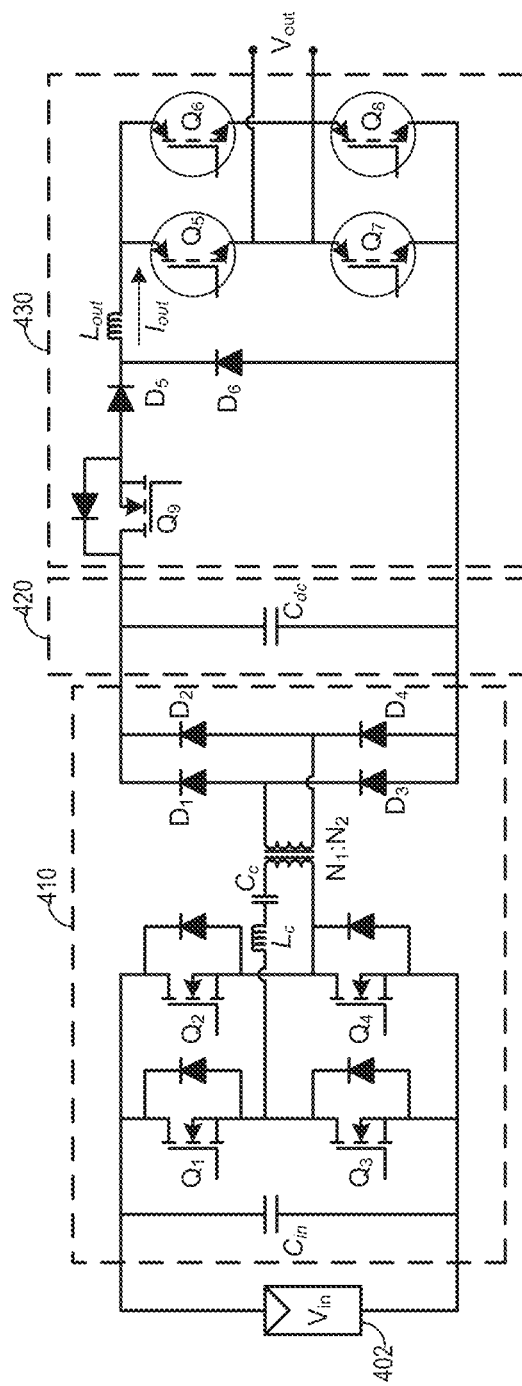

FIGS. 4*a-b* illustrate an example micro-inverter 400 that does not include switchable reactive elements for performing VAR control. The micro-inverter 400 is one of several micro-inverters that converts DC power into AC power for the grid. These micro-inverters do not include reactive elements that can be switched in or switched out for power factor adjustment purposes. VAR control is performed on the combined power output of the several micro-inverters.

The micro-inverter 400 receives DC power from a PV cell 402 and produces AC power to be combined with AC power produced by other micro-inverters. The PV cell 402 is a DC power source that may include one or more DC sources connected in series or in parallel. A combiner 404 combines the powers from the individual micro-inverters and sends the combined power to a VAR control module 406, which supplies a VAR adjusted power to 3-phase AC grid tie point 408. A grid sensing mechanism 405 monitors and measures the voltage and the current of the AC power being injected into the grid tie point 408. The voltage and current measurements are then delivered to the micro-inverter 400. In some embodiments, a system controller 409 controls the micro-inverter 400 along with other inverters in the system.

The micro-inverter 400 is a power conditioning unit that includes a DC/DC power converter 410, a DC link 420, a DC/AC converter 430, a filter 440, a circuit protection stage 450, a micro-controller 460, and a communications link 470. The communications link 470 is for communicating with the system controller 409 as well as receiving current and voltage measurements from the grid sensor 405. In some embodiments, the communications link 470 is a wireless transceiver using communication protocol such as Zigbee.

The DC/DC power converter 410 is for converting DC power received from the PV cell 402 from an initial (generally lower) input DC voltage level into a higher DC voltage level for the DC link 420. The DC/DC power converter 410 may be a step-down converter or a step-up converter. The DC/DC power converter 410 may amplify and/or attenuate the input DC voltage received from the PV cell 402. In addition, the DC/DC power converter 410 in some embodiments provides electrical isolation by means of a transformer or a coupled inductor. In some embodiments, the electrical conditioning of the input DC voltage is such that the voltage across the dc link 420 is higher than the voltage at the grid 408. In some embodiments, the DC/DC power converter 410 contains one or more transistors, inductors, and capacitors. The transistor(s) are driven by a pulse width modulation (PWM) generator in some embodiments. The PWM signal(s) have variable duty cycle, that is, the ON time is variable with respect to the period of the signal. This variation of the duty cycle effectively controls the amount of power transferred across the DC/DC power converter stage 410.

The DC link 420 in some embodiments includes an energy storage capacitor that serves as reservoir of electrical energy for the DC/AC converter stage 430. In some embodiments, this reservoir capacitor is a non-electrolytic capacitor such as a film capacitor. The reservoir/energy storage capacitor acts as an energy buffer from the input to the output. Energy is supplied into the capacitor via the DC/DC converter stage 410 at the same time that energy is extracted from the capacitor via the DC/AC converter stage 430.

The DC/AC converter stage 430 draws electrical energy stored in the DC link 420 and produces AC power output. As illustrated in FIG. 4*b*, $Q_9$, $D_5$, $D_6$ and $L_{out}$ of the DC/AC converter stage 430 perform current shaping. In alternative arrangements this function may be located in a connection between the bridge circuit and the dc link capacitor 420. $D_6$ acts as a free-wheeling diode and $D_5$ prevents current form flowing back into the dc-link. When transistor $Q_9$ is switched on, a current builds up through $L_{out}$. When $Q_9$ is switched off, this current cannot return to zero immediately so $D_6$ provides an alternative path for current to flow from the negative supply rail ($D_5$ prevents a current flowing back into the dc-link 420 via the body diode $Q_9$ when $Q_9$ is switched off). Current injection into the grid is controlled using $Q_9$. When $Q_9$ is turned on, the current flowing through $L_{out}$ increases. The current flow decreases when $Q_9$ is turned off (as long as the dc-link voltage is maintained higher than the grid voltage magnitude). Hence the current is forced to follow a rectified sinusoid, which is in turn unfolded by the full-bridge output (transistors $Q_5$ to $Q_8$). Information from an output current sensor is used to feedback the instantaneous current value to a control circuit (e.g., the micro-controller 460). The current $i_{out}$ of the inductor $L_{out}$ is compared to a reference current, $i_{ref}$, to determine whether or not to switch on transistor $Q_9$. If the reference current is higher than $i_{out}$ then the transistor $Q_9$ is turned on; the transistor $Q_9$ is switched off otherwise. The reference current, $i_{ref}$, may be generated from a rectified sinusoidal template in synchronism with the ac mains (grid) voltage.

Transistors $Q_5$-$Q_8$ constitutes an "unfolding" stage. Thus these transistors $Q_5$-$Q_8$ form a full-bridge that switches at line frequency using an analogue circuit synchronized with the grid voltage. Transistors $Q_5$ and $Q_8$ are on during the positive half cycle of the grid voltage and $Q_6$ and $Q_7$ are on during the negative half cycle of the grid voltage.

In some embodiments, the micro-inverter comprises a generic dc-ac-dc isolation, and a current source inverter (CSI) connected to the mains. The generic dc-ac-dc provides voltage amplification of the source to above the grid voltage. The current injection is regulated using current shaping (current-control) in the inductor of the CSI via the intermediate buck-type stage. Further description of such a micro-inverter can be found in U.S. Patent Application Publication No. 2011/0205766.

In some embodiments, the micro-controller unit 460 controls the unfolding of the AC current in the DC/AC converter stage 430 by controlling the driving signals to the unfolding transistors. In other words, the micro-controller unit 460 controls the transfer of power from the DC link 420 to the output of the micro-inverter 400. The micro-controller 460 may be configured to cause the DC/AC converter to inject a substantially sinusoidal current into the grid regardless of the voltage across the dc link 420. In some embodiments, the micro-controller 460 implements a control method that balances the average energy transfer and allows a voltage fluctuation, resulting from the injection of ac power into the mains, superimposed onto the average dc voltage of the reservoir capacitor in the DC link 420. In some embodiments, the frequency of the oscillation can be either 100 Hz or 120 Hz depending on the line voltage frequency (50 Hz or 60 Hz respectively).

The micro-controller unit 460 is illustrated as controlling the DC/AC converter stage. In some embodiments, the micro-controller unit controls both the DC/AC converter stage 430 and the DC/DC converter stage 410. In some embodiments, the DC/DC converter stage 410 is controlled by another control mechanism that is independent of the micro-controller unit 460. In some embodiments, the controller for the for DC/DC converter stage 410 senses the dc input voltage (and/or current) and provides a PWM waveform to control the transistors of the DC/DC converter stage 410 (i.e., transistors $Q_1$-$Q_4$) to control the power transferred from the DC source (i.e., PV cell 402) to the DC link. The controller for the DC/AC stage 430 senses the output current (and voltage) and controls the transistors of stage 430 (i.e., transistors $Q_5$-$Q_8$) to control the power transferred to the output of the micro-inverter (and then onto the grid mains).

In some embodiments, the microcontroller 460 implements some form of maximum power point tracking (MPPT) algorithm. In some embodiments, the microcontroller 460 is configured to control whether one or both of the converter stages are operational, and to implement "soft" switching off of one of these stages when required. The microcontroller 460 and/or associated hardware may also be configured to interleave the power transistor switching in order to reduce ripple on the DC link 420.

The micro-controller unit 430 also receives information from the communications link 470. Such information may include command from the system controller 409 to shut down power generation, or to reduce the amount of AC power being produced by the micro-inverter 400. The system controller 409 may also command the micro-controller 460 to report the power level that is being produced by the micro-inverter 400. For some embodiments that use micro-inverters to generate AC power for a multi-phase power system, the system controller 409 uses the communications link 470 to control the micro-inverter 400 along with other micro-inverters in the multi-phase system in order to balance the power output levels of the different phases. In some embodiments, the micro-inverter 400 knows its net power output because the micro-controller is able the measure its own output RMS voltage as well as its own output current amplitude.

In addition to receiving commands from a system controller, the micro-controller 460 in some embodiments also receives voltage and current measurements at the point when AC power generated by the micro-inverters is injected into the grid. This measurement is provided by the grid sensor 405, which samples the current and the voltage near the grid tie point 408. Based on this information, the micro-controller 460 in some embodiments adjusts its control of the unfolding stage in order to ensure that the phase of AC power being produced by the micro-controller, upon reaching the grid tie point, will match the phase of the AC power at the grid tie point 408. Since the AC power produced by the micro-inverter must go through the combiner 404, the VAR control 406, and other electrical connections before reaching the grid tie point 408, the micro-controller 460 adjusts the phase of the AC power being generated by the micro-inverter to compensate for the impedance that are introduced by the intervening elements (i.e., the VAR control 404, the combiner 404, and electrical connections, etc.) The operation to synchronize the AC output of the micro-inverter with the grid tie point across electrical connections and impedances is described in U.S. Pat. No. 8,310,101.

Figure 5:
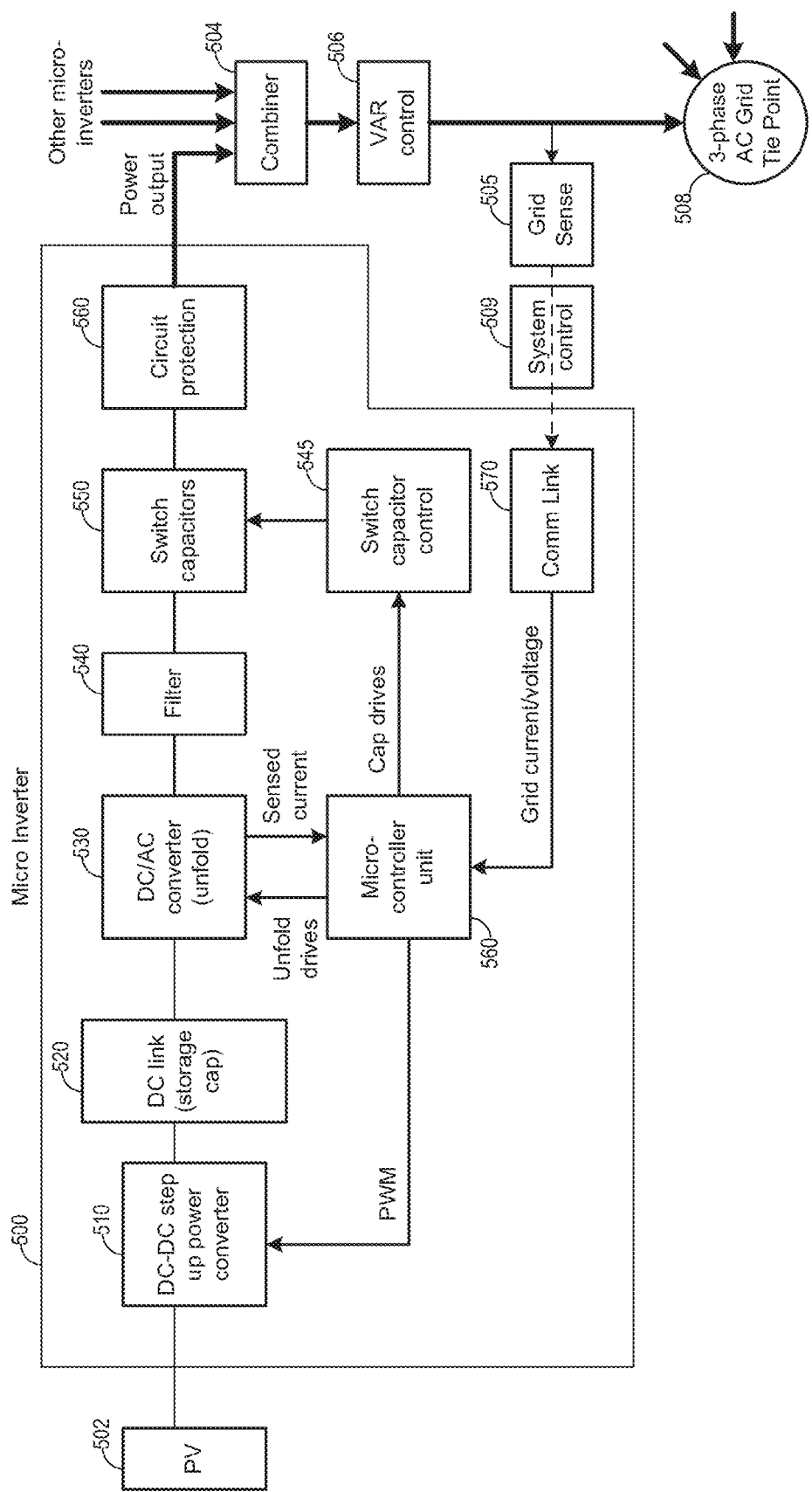
FIG. 5 illustrates a micro-inverter that includes its own set of switch capacitors for performing VAR operations.

In some embodiments, a micro-inverter in the multi-phase power generation system includes its own sets of switch capacitors and performs at least part of the VAR control operations. FIG. 5 illustrates a micro-inverter 500 that includes its own set of switch capacitors for performing VAR operations. The micro-inverter 500 is similar to the micro-inverter 400 in that it also receives DC power from a PV cell 502 and produces AC power to be combined with AC power produced by other micro-inverters. The micro-inverter 500 includes a DC/DC power converter 510, a DC link 520, a DC/AC converter 530, a filter 540, a circuit protection stage 550, a micro-controller 560, and a communications link 570. The AC power output of the microcontroller 500 is combined with other micro-controllers by a combiner 504. The combined power goes through a VAR compensator 506 before reaching the grid tie point 508. The communication link 570 receives voltage and current measurements from the grid sensor 505 as well receiving commands from a system controller 509.

However, unlike the micro-inverter 400, the micro-inverter 500 includes a bank of switch capacitors 545. The switch capacitors are switched in or out across the AC output of the micro-inverter 500 by a set of capacitor drive signals from the micro-controller 560. The switch capacitors 545 provide leading power factor. In some embodiments, the micro-inverter 500 includes an output stage with a current source inverter topology that can provide a lagging power factor.

In some embodiments, the micro-controller 560 makes a closed-loop determination on the power factor adjustment based on the measured voltage and current readings from the grid sensor 505. In some embodiments, the micro-inverter 560 makes performs open loop control of displacement power factor. In some embodiments, the system employs open loop control of the displacement power factor—that is, the system does not need to measure a power factor in order to compensate to provide the desired response. Instead, the system controller senses (measures) the power output level of each micro-inverter and then controls the overall displacement power factor based on a percentage of the total power available. Thus each micro-inverter module only needs to know its own output power level, and to report this to the system controller, which adds up the individual power contributions to determine the overall number of capacitors to apply for dissipation power factor compensation.

In some embodiments, an inverter knows the percentage of the full power output current it is providing and therefore the power measurement parameter or parameters provided back to the system controller may either comprise an absolute value of an output current or a percentage of a total potential output current, or an absolute output power or a percentage of a total output power. Based upon this, the system controller 509, via a commutations network (which includes the communication link 570), can then control the local power factor controllers switching the capacitors in/out thus although a control loop is employed in the sense that an inverter measures power output or a parameter dependent upon this, provides this to the system controller, and then receives back control data for switching its capacitor in/out, the system is open loop in the sense that the displacement power factor per se is not measured.

As mentioned above by reference to FIG. 2, some embodiments combine the outputs of multiple micro-inverters or power conditioning units into one combined AC power output. Some embodiments combine all AC power generated for a particular phase of a multi-phase power system into one combined AC power output. For some embodiments that provides a three-phase power system, combiners are used to combine the outputs of an array of micro-inverters into three combined AC power outputs, each combined AC power output for one phase of the three-phase power system.

Figure 6:
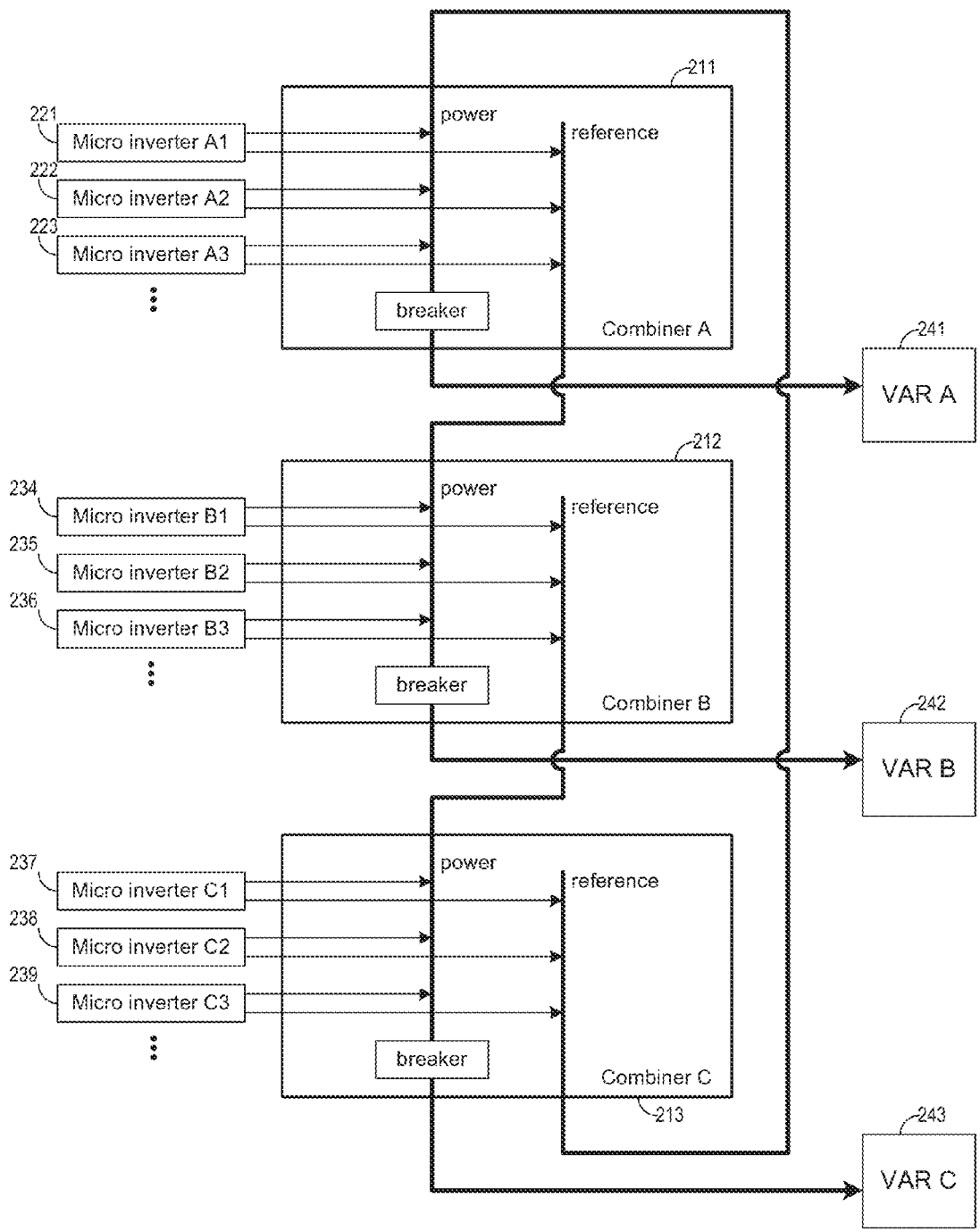
FIG. 6 illustrates combiners of the three-phase power system.

FIG. 6 illustrates the combiners 211-213 of the three-phase power system 200 in greater detail. The combiners 211-213 combine the AC powers generated by the array of micro-inverters 221-229 into three combined AC power outputs for the three different phases of the three-phase power system. The combiner 211 combines the AC power generated by the micro-inverters 221-223 into one combined AC power for phase A, the combiner 212 combines the AC power generated by the micro-inverters 224-226 into one combined AC power for phase B, the combiner 213 combines the AC power generated by the micro-inverters 227-229 into one combined AC power for phase C. One of ordinary skill would understand that the array of micro-inverters 221-229 may include more or less inverters than the nine illustrated, and each combiner may receive and combine outputs from more or less inverters than the three illustrated. The AC power combined by the combiners 211, 212, and 213 are then fed to VAR control modules 241, 242, and 243 for the phases A, B, and C, respectively.

Within each combiner, the received outputs from the micro-inverters are tied together. As illustrated, the combiner receives both the power wire and the ground reference wire from each of the micro-inverters. The power wires are electrically tied together by one electrical connection and the ground reference wires are tied together by another electrical connection. The electrical connection tying the power wires of combiner 211 of phase A goes to the VAR controller 241 of phase A, the electrical connection tying the power wires of combiner 212 of phase B goes to the VAR controller 242 of phase B, and the electrical connection tying the power wires of combiner 213 of phase C goes to the VAR controller 243 of phase C. The electrical connection for the power wires also includes protection device such as a fuse or a circuit breaker.

In some embodiments, the three phases of the multi-phase system are crossed-referenced, namely, the power connections of each phase of the multi-phase power is connected to the reference wire of another phase. In these embodiments, the reference coming from the micro-inverters of a particular phase are tied together and delivered to another phase. As illustrated in FIG. 6, the electrical connection for the reference in the combiner 211 for phase A is sent to connect the power connection of phase B, the electrical connection for the reference in the combiner 212 for phase B is sent to connect the power connection of phase C, and the electrical connection for the reference in the combiner 213 for phase C is sent to connect the power connection of phase A. In some embodiments, the ground connection of each phase is not connected to the power connection of another phase. In some of these embodiments, the ground reference connections of the different phases are joined together as one shared neutral reference connection (not illustrated).

As mentioned, in some embodiments, each phase of the multi-phase power system is equipped with its own VAR control module, which performs power factor adjustment or correction on the combined AC power from the combiners. The VAR controller of a phase is equipped with a set of the switch capacitor and a set of switch inductors that can be switched in and out for adjusting the displacement power factor of that phase. In some embodiments, the VAR control module of a particular phase alone performs the power factor correction on the AC power produced for that particular phase. In some embodiments, the VAR control module of a particular phase performs power factor correction in conjunction with VAR control functionalities within the micro-inverters.

Figure 7:
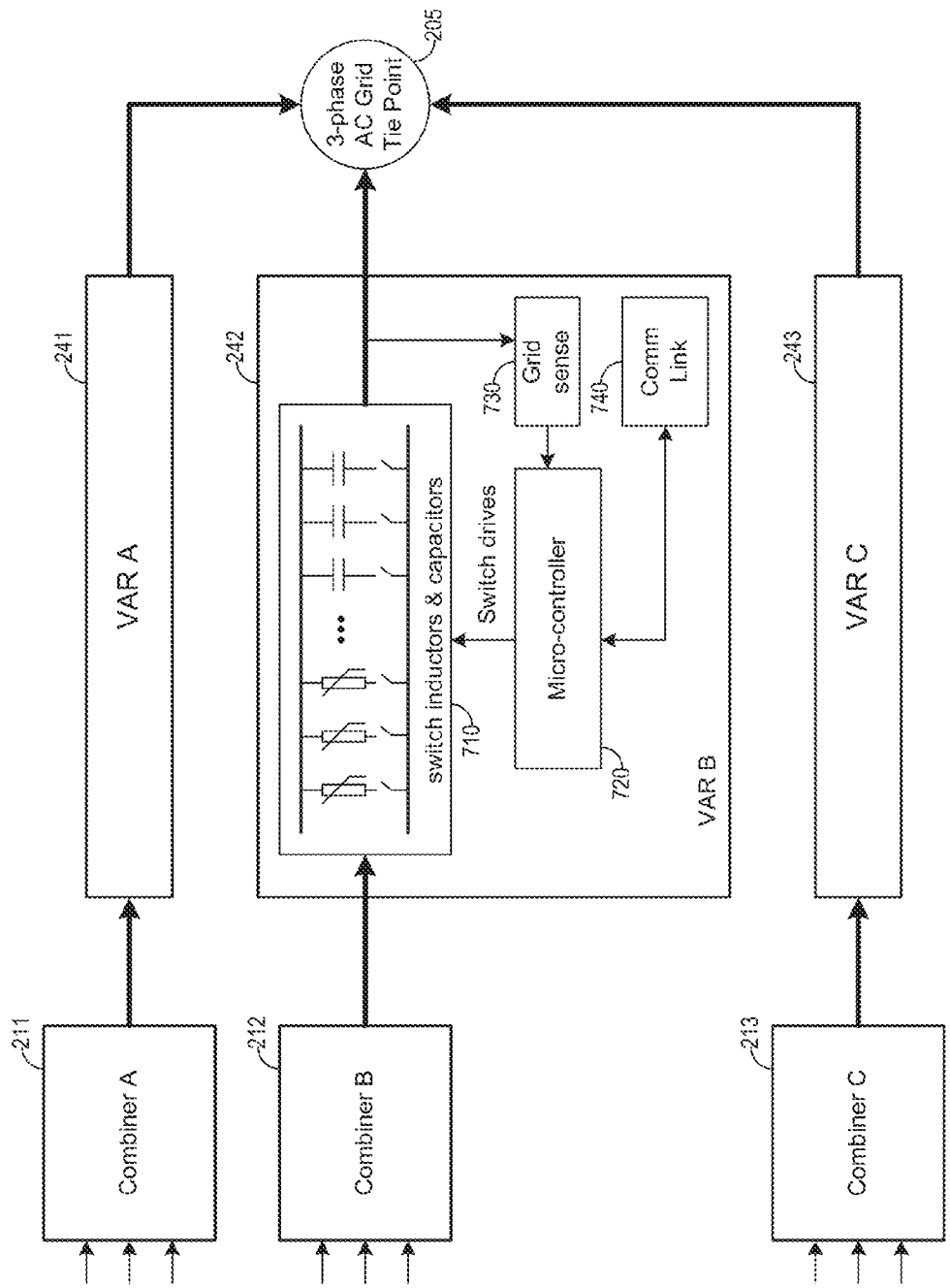
FIG. 7 illustrates VAR controllers of a three-phase power system.

FIG. 7 illustrates the VAR controllers 241-243 of the three-phase power system 200 in greater detail. For purpose of illustrative clarity, the figure provides detail only for the VAR controller 242 for phase B. However, one of ordinary skill would understand that the same detail applies equally to VAR controller 241 of phase A and VAR controller 243 of phase C. The VAR controller 242 includes a set or sets of reactive elements 710, a micro-controller 720, a grid sensor 730, and a communications link 740.

The VAR controller 242 of phase B receives power output from combiner 212 of phase B. The received power is sent to the set or sets of reactive elements 710, which switchably places reactive elements of various sizes across its output to the grid tie point 205. The switching operations of the set or sets of reactive elements are controlled by the micro-controller 720, which receives measurements of the voltage and of the current being injected into the grid for phase B from the grid sensor 730. Based on the measurement provided by the grid sensor 730, the micro-controller performs computation to determine which of the reactive elements in the set of reactive elements 710 to switch-in or to switch out.

The VAR controller 242 is also in communication with a system controller (not illustrated) of the multi-phase power system through the communications link 740. The communications link 740 can be in a wired communication network or a wireless communication s network such as ZigBee. In some embodiments, the VAR controller 242 does not include a grid sensor such as 730, but rather rely on a system controller to supply the requisite voltage and current measurement to the micro-controller 720 through the communications link 740. In some embodiments, the VAR controller 242 does perform the receive voltage and current measurements at all, but rather receive from the communications link 740 a required necessary power factor adjustment value, based on which the micro-controller 720 decides which reactive element to switch-in or switch-out. In some embodiments, the VAR controller 242 receives direct commands that switch in or out specific reactive elements from the communications link 740.

In order to determine the necessary adjustment for power factor of a particular phase, the micro-controller 720 in some embodiments (or the system controller in some embodiments) must first determine the displacement power factor (i.e., the difference between the phase of the current and the phase of the voltage) of the power being injected into the grid. The micro-controller 720 makes this determination based on the current and voltage measurements provided by the grid sensor 730. VAR control also requires the current power output level being produced for that phase. In some embodiments, this total power output level is determined from the current and voltage measurements provided by the grid sensor 730. In some embodiments, this total power output level is gathered from all of the micro-inverters connected that phase. In some embodiments, the micro-controller 720 of the VAR controller 242 would gather this information from the micro-inverters 224-226 (micro-inverters of phase B) via the communications link 740. In some other embodiments, a system controller polls each micro-inverter from the array of micro-inverters 221-229 and provides the power readings to the VAR controller 242.

Figure 8:
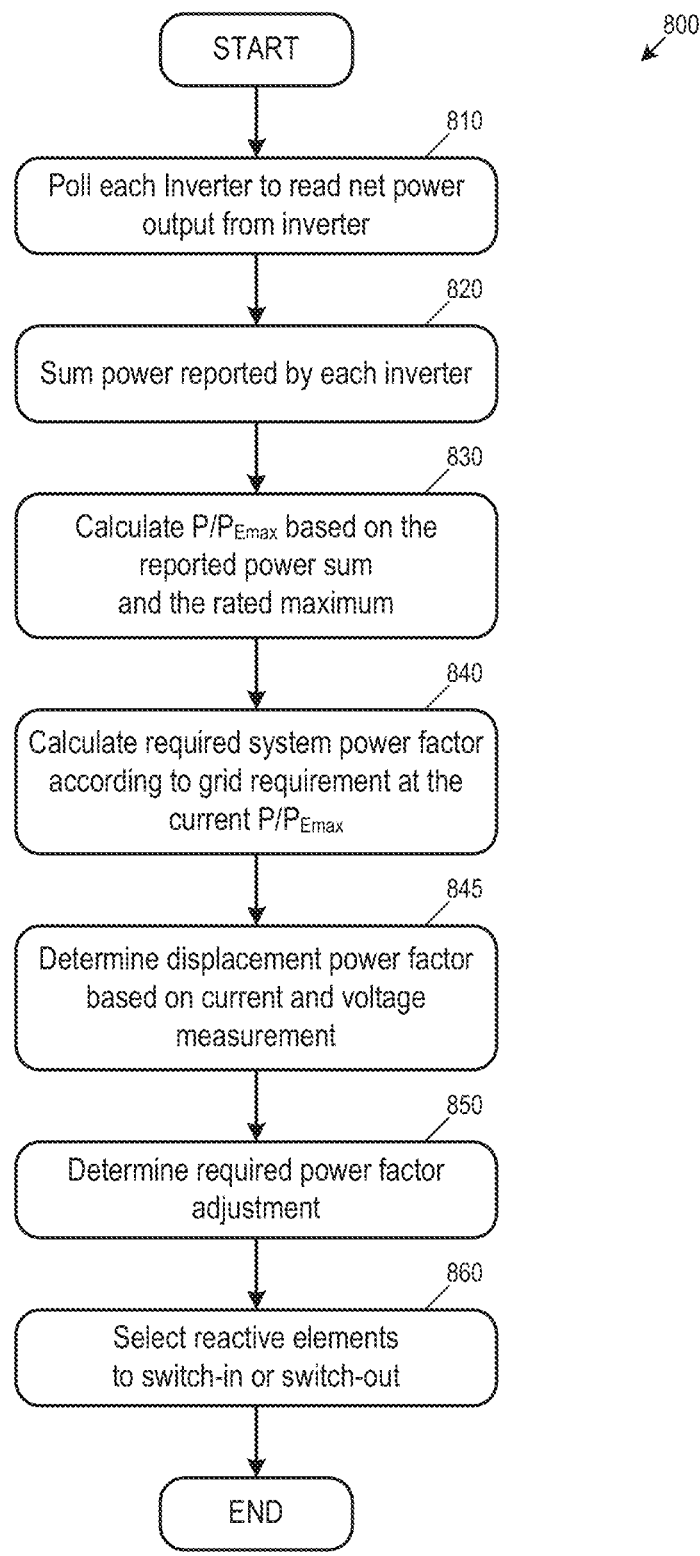
FIG. 8 conceptually illustrates a process for performing VAR control.

FIG. 8 conceptually illustrates a process 800 for performing VAR control or power factor adjustment. It computes the necessary power factor adjustment based on a grid requirement curve and makes the necessary adjustment by switching in or out reactive elements. In some embodiments, the process 800 is performed for one of the phases of a multi-phase power generation system. In some embodiments, the process 800 is performed in a VAR control module by a micro-controller (such as the micro-controller 720). In some embodiments, the process 800 is performed by a single system controller for the entire power generation system. In some embodiments, the process 800 is jointly performed by several controlling units in the power generation system.

The process polls (at 810) each micro-inverter to read the micro-inverter's net power output. As mentioned earlier, a micro-inverter in some embodiments knows its own net power output because its RMS voltage is known (or measured) and its output current amplitude is known. These information are known to the micro-inverters because they are controlled by the micro-inverter itself. In some embodiments, the process 800 polls each micro-inverter and obtains the polled result from a communications network that allows a controller performing the process 800 to communicate with the micro-inverters.

Next, the process sums (at 820) the power reported from the inverters. For a multi-phase power system, the power readings polled from micro-inverters connected to a same phase are added together to derive at a current total power being generated for that phase. The process then calculates (at 830) the power level percentage or ratio ($P/P_{Emax}$) based on the reported power sum with respect to the rated maximum. For a multi-phase power system, the rated maximum of one phase is the sum of the rated maximum of the micro-inverters of that phase.

With the power level percentage or ratio computed, the process determines (at 840) a required system power factor according to the grid requirement at the current power level ratio ($P/P_{Emax}$). An example of the grid requirement is provided in FIG. 1 above, which specifies power factor requirement from 0% power level ratio to 100% power level ratio.

The process then calculates (at 845) displacement power factor. In some embodiments, this is based on the difference in phase between the current and the voltage being injected into the grid. Some embodiments make this determination based on received voltage and current measurement from the grid sensor. The process then determines (at 850) the requisite power factor adjustment. This is based on the difference between the required power factor determined in operation 840 and the displacement power factor calculated in operation 845.

Based on the requisite power factor adjustment, the process selects (at 860) reactive elements to switch-in or switch-out. In some embodiments, the requisite power factor adjustment is specified in terms of capacitance, thus if the required adjustment has a positive capacitance value (e.g., when the current lags voltage beyond requirement), the process would select capacitors to switch-in. If the requisite power factor adjustment has negative capacitance value (e.g., when current leads voltage beyond requirement), the process would select inductors to switch-in.

Figure 9:
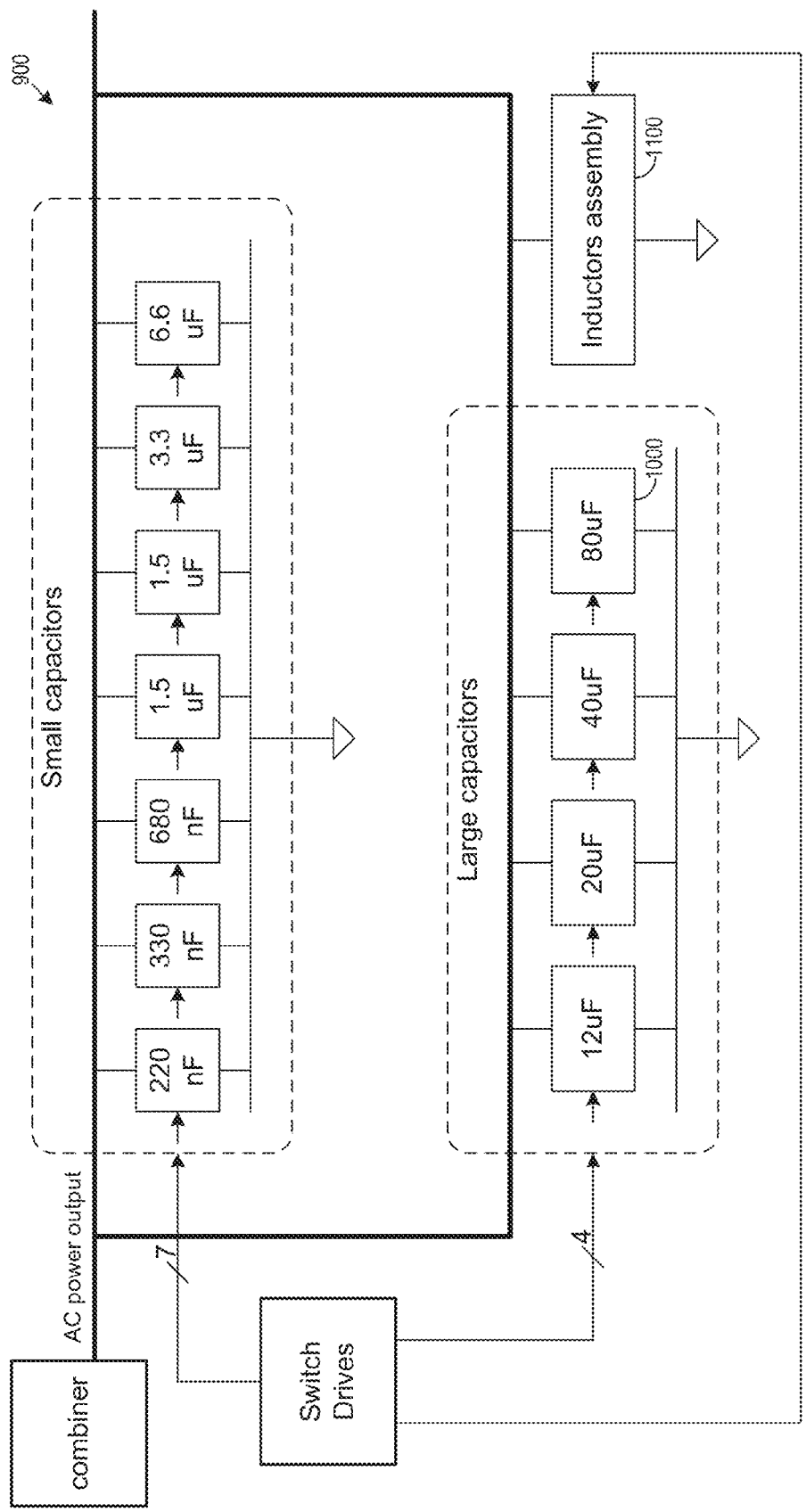
FIG. 9 illustrates a set of reactive elements that are available for switch-in by VAR control operations.

FIG. 9 illustrates a set or sets of reactive elements 900 that are available for switch-in by VAR control operations of some embodiments. The reactive elements include switch capacitors and switch inductors. Each of the reactive elements receives a switch drive signal to determine whether the reactive element is switched in or switched out, i.e., whether the reactive element is used to affect the displacement power factor of the power being injected into the grid. Each of the switch capacitors is in parallel with the AC power output (from the combiner and to be injected into the grid). The switch inductors are organized into an inductor assembly 1100 that is also parallel with the AC power output. The inductor assembly 1100 will be further described below by reference to FIG. 11.

To add a particular capacitance value to be in parallel across the AC power output, the VAR control would select a set of capacitors to be switched in, whose sum would be near the desired capacitance value. The switch capacitors include capacitors of various capacitances, including "small" capacitors with "small" capacitance values and capacitors with "large" capacitance values. In the example of FIG. 9, the set of switch capacitors includes switch capacitors with capacitances 220 nF, 330 nF, 680 nF, 1.5 uF, 1.5 uF, 3.3 uF, 6.6 uF, 12 uF, 20 uF, 40 uF, and 80 uF. In some embodiments, the selection of the capacitor values is for providing a sufficiently wide range of possible equivalent capacitance at a sufficiently fine granularity. The selection of capacitor values is also based on cost and availability of components. The criteria for capacitor selection and the relationship between the selected capacitor values will be further described below by reference to FIGS. 13*a-b*. An example switch capacitor for some embodiments is provided below by reference to FIG. 10.

Figure 10:
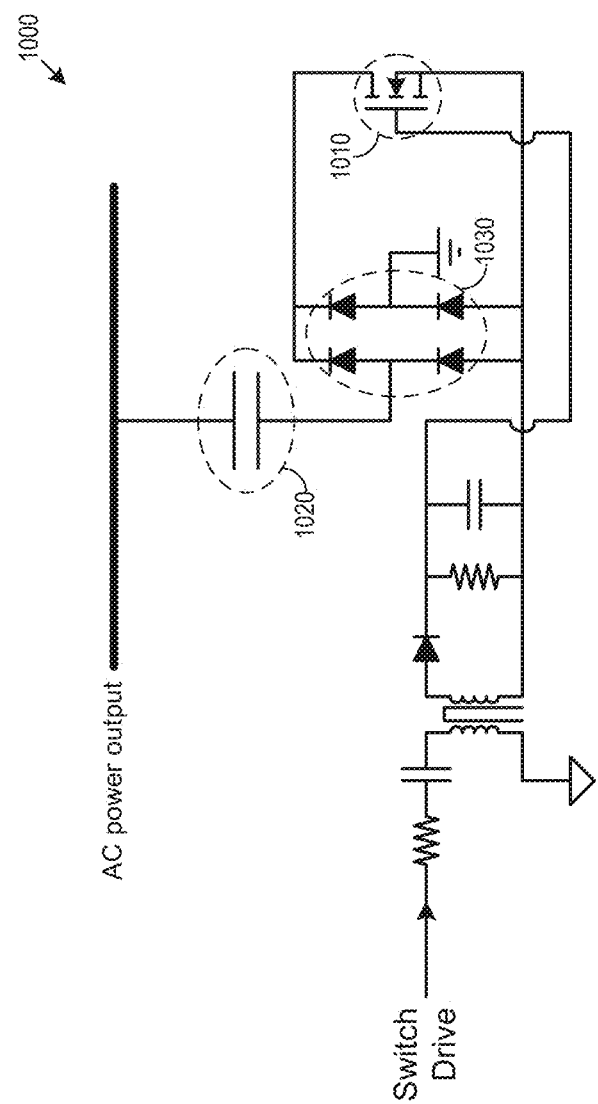
FIG. 10 illustrates an example switch capacitor.

FIG. 10 illustrates an example switch capacitor 1000 for some embodiments. The switch capacitor uses a MOSFET to 1010 to connect or disconnect a capacitor 1020 in parallel to the AC power. The MOSFET 1010 is turned on or off by the switch drive signal. Diodes 1030 provide the path way for electrical current to flow between the AC power output and the reference ground through the capacitor 1020 in both directions.

Figure 11:
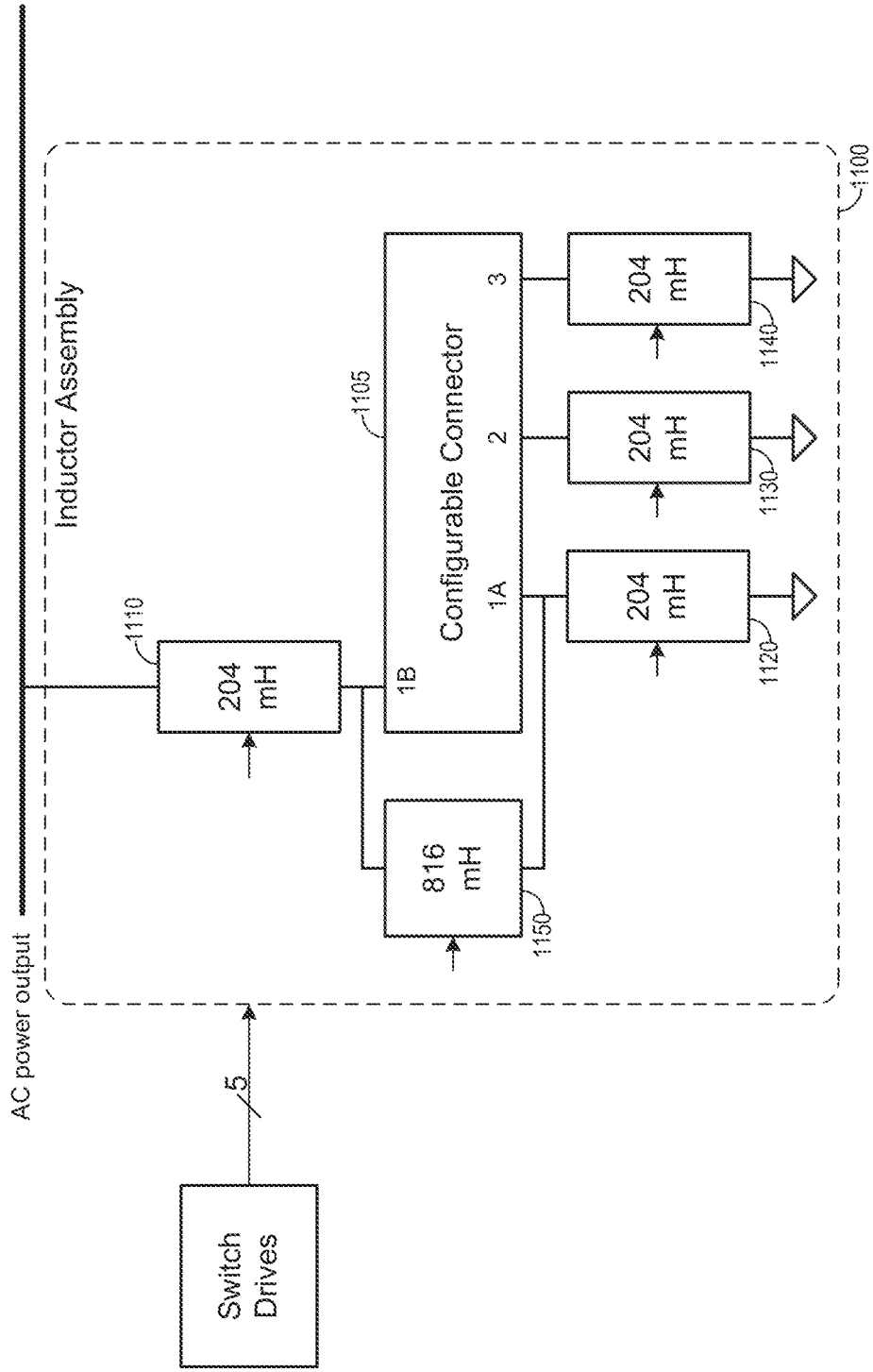
FIG. 11 illustrates an inductor assembly.

FIG. 11 illustrates an inductor assembly 1100 for some embodiments. Like each of the switch capacitors, the inductor assembly 1100 is also in parallel with the AC power output. The inductor assembly includes five switch inductors 1110, 1120, 1130, 1140, and 1150. The inductor assembly also includes a configurable connector 1105, which configurably interconnects the switch capacitors 1110-1150. Each of the switch inductor receives a switch drive signal from a controller (such as the micro-controller 720 inside the VAR control module 242) that determines whether switch inductor is switched in or out for power factor adjustment.

In some embodiments, the VAR control operation is capable of providing displacement power factor correction for Φ in all four quadrants. To provide full range of inductance value needed to accomplish the four-quadrant power factor correction, it is necessary for the VAR control of the system to have access to large inductance values. Furthermore, since this is a power generation system, it is necessary to use inductors capable of handling large amount of current without reaching magnetic saturation. This requires the use of inductors that are physically bulky (some weighing more than 8 kg). Some embodiments therefore only incorporate switch inductors for the combined power output of a phase rather than in individual micro-inverters.

In some embodiments, the various inductors of the inductor assembly 1100 are sequentially switched in based on the amount of current that is being generated for injection into grid. In some of these embodiments, if the current being generated across the AC power output is saturating inductors that are currently switched in, additional inductors will be switched in to handle the additional current and avoid magnetic saturation.

In the example inductor assembly 1100, four of the switch inductors (1110-1140) have smaller similar or identical inductance value (204 mH), while the fifth inductor (1150) has a larger inductance value (816 mH). The five switch inductors are interconnected by the configurable connector 1105, which has four terminals (1A, 1B, 2, and 3). The switch inductor 1110 connects terminal 1B and the AC power output. The switch inductor 1120 connects terminal 1A and the ground, the switch inductors 1130 connects terminal 2 and the ground, and the switch inductor 1140 connects terminal 3 and the ground. The largest inductor 1150 connects both terminal 1A and terminal 1B, allowing it to be in series with both the switch inductor 1110 and the switch inductors 1120-1140.

The connector 1105 allows the five switch inductors in the assembly 1100 to be connected in a number of different configurations. For example, the connector 1100 allows the inductor 1110 connecting the AC power output (1110) to be in series with the large inductor (1150) and then in series with the inductors connecting the reference ground (1130-1150). The connector can also bypass the large inductor 1150 all together and allow the switch inductor 1110 to be in series directly with the switch inductors 1130-1150. Each of the switch inductors 1110-1150 can also be switched in or switched out based on the switch drive signal it receives. The inductor assembly 1100 is therefore able to provide a variety of different inductance values.

Figure 12A:
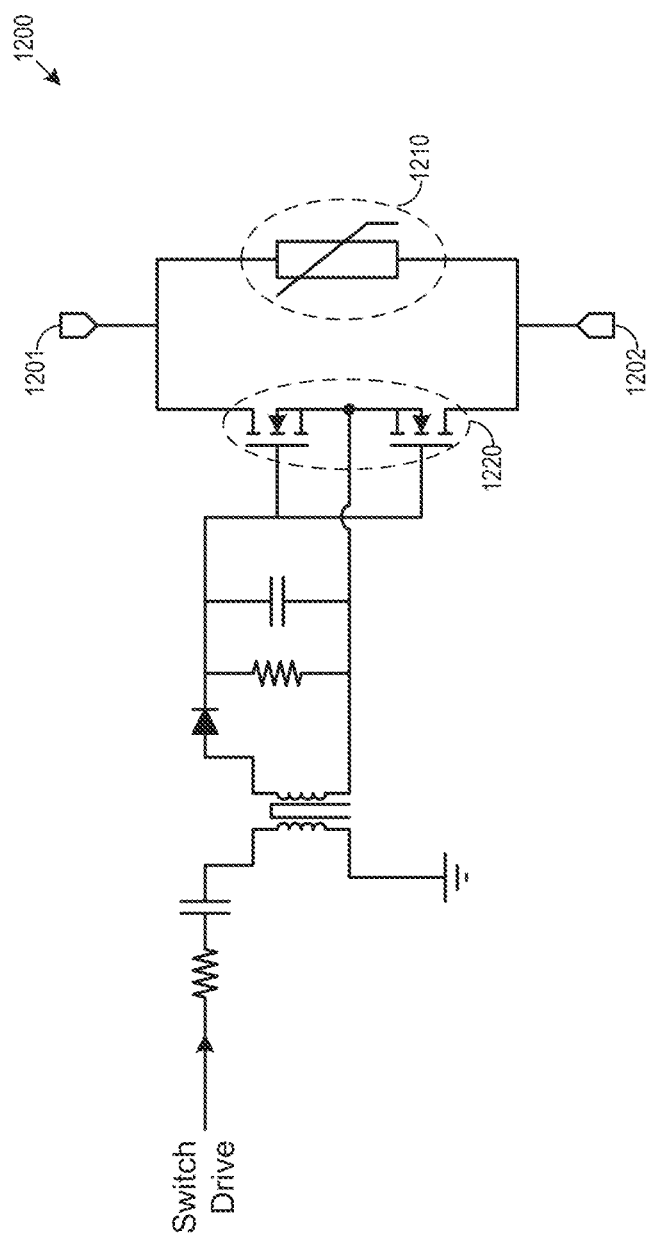
FIGS. 12a-b illustrates switch inductor s.

FIG. 12*a* illustrates a switch inductor 1200 for some embodiments. The switch inductor includes two connection ports 1201 and 1202, an inductor 1210, and one back to back pair of MOSFETs 1220. The MOSFETs 1220 are turned on or off by the switch drive signal. When the switch inductor is switched in, the current is permitted to flow through the inductor 1210 and provide the needed inductance. In some embodiments, the switch inductors 1110, 1120, and 1150 uses the implementation of switch conductor 1200. The connection ports 1201 and 1202 are for connecting to the AC power output, ground, or the configurable connector 1105. For example, for the switch connector 1110, the port 1201 is for connecting AC power output while the port 1202 is for connecting the configurable connector port 1B.

Figure 12B:
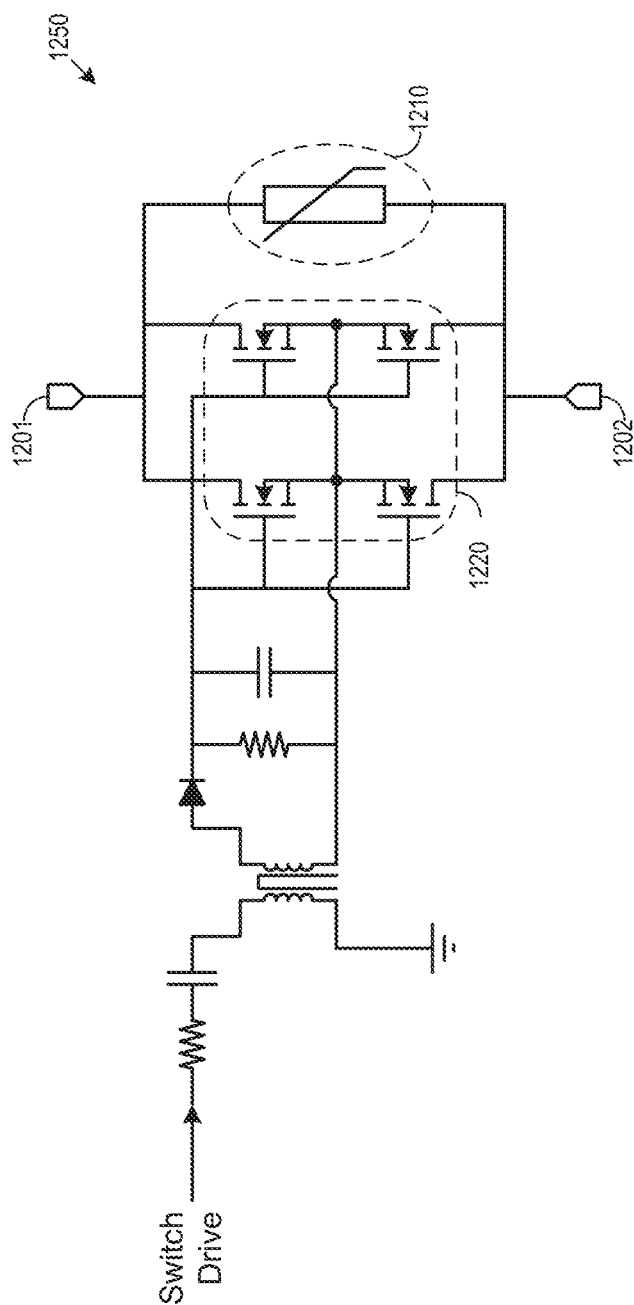

FIG. 12*b* illustrates another switch inductor 1250 for some embodiments. The switch inductor 1250 is similar to the switch inductor 1200, except it has two pairs of back to back MOSFETs instead of one. In some embodiments, the switch inductors 1130 and 1140 use the implementation of switch conductor 1250.

In some embodiments, the device switching a capacitor or inductor in/out of parallel connection across the ac output may be an electromechanical device. In some embodiments, a triac is employed as the electronic switch as this is particularly effective in handling power surges. Where a triac is employed this may be turned on by a single pulse (or current) timed to be provided when the current through the device is increasing (so that it latches), or by a train of pulses (which relaxes the timing requirements). Turning the device on with a single pulse can, in embodiments, be preferable as less power is required.

In some embodiments where an electronic switching device is employed, the switching device turned on (or off) substantially at the peak of the grid voltage. This is because the current in the reactive element is 90 degree out of phase with this voltage and thus the peak grid voltage coincides with a capacitor current of substantially zero. However, initially the electronic switching device may be switched in at a zero-crossing of the grid voltage, to reduce stress on the VAR control reactive elements.

Thus, where a triac is employed, the triac is first switched on at a zero-crossing of the grid voltage in some embodiments. In some embodiments of this approach, the power factor controller may be configured to generate a train of pulses for at least one complete cycle of the grid power to control the triac on, preferably generating the pulse train for a plurality of cycles of the grid power, for example more than 5 or 10 complete cycles. Then, after allowing time for the switching transient to die down, the triac may be driven by a single pulse or pulse train at substantially a peak voltage of the ac power.

II. VAR Control Algorithm

The availability of the various switch capacitors and switch inductors in the VAR control module allows accurate, incremental control of the displacement power factor. Specifically, by incrementally increasing the number of capacitors across the AC power output, some embodiments increase the total applied capacitance in a stepwise fashion to control the displacement power factor of the power source. In some embodiments, the desired power factor response can be approximated to an arbitrary degree of accuracy by employing sufficiently small steps. In practice the number of steps depends upon the tolerance permitted for the system. In some embodiments, the switching in/out of a capacitor or inductor may employ phase control to control a proportion of an ac cycle for which the capacitor is switched in in order to provide a variable degree of power factor compensation. Some embodiments use switch inductors to provide coarse power factor adjustment in the direction of lagging power factor before relying on the array of switch capacitors to provide fine-grained the power factor adjustment in the direction of leading power factor. In some embodiments, there is a threshold level of summed power from the inverter modules below which none of the capacitors of the inverter modules are connected across their respective ac outputs.

For some embodiments in which the micro-inverters are also capable perform at least part of the VAR control operation, the method of controlling the power factor of the system include a design step of selecting one or both of a number of solar inverter modules (and their respective ratings), and a number of switchable capacitors (where a capacitor may be implemented by a plurality of parallel connected physical devices) in each inverter module to provide the facility for stepwise control of the displacement power factor to within a desired tolerance limit, for example +/−1%. In embodiments the tolerance limit may be better than 5%, 3%, 2%, or 1% (that is, better than +/−2.5%, 1.5%, 1%, or 0.5%).

As mentioned above, the array of available capacitor values for VAR control is selected for the purpose of providing a sufficiently wide range of possible equivalent capacitance values at a sufficiently fine granularity. The selection of capacitor values is also based on cost and availability of components. In some embodiments, the smallest capacitors values in the set of capacitors provides adequate resolution in power factor change at lowest required operating power (e.g. 5% of minimum required full system power level). In some embodiments, the capacitances of the largest capacitors are varied such that their capacitances are factors of power of two from each other. In some embodiments, at least some of the capacitors in the set are valued such that the sum of all capacitor values smaller than a given capacitor exceeds that given capacitor value. In some embodiments, the smallest of the "large" capacitors is smaller than the sum of all of the "small" capacitor values. In some embodiments, the selection of capacitor values is performed by a VAR control module for a combined power output of one phase of a multi-phase power generation system. In some embodiments, the selection of capacitor values is performed by a micro-inverter having a set of switch reactive elements for performing VAR control.

Figure 13A:
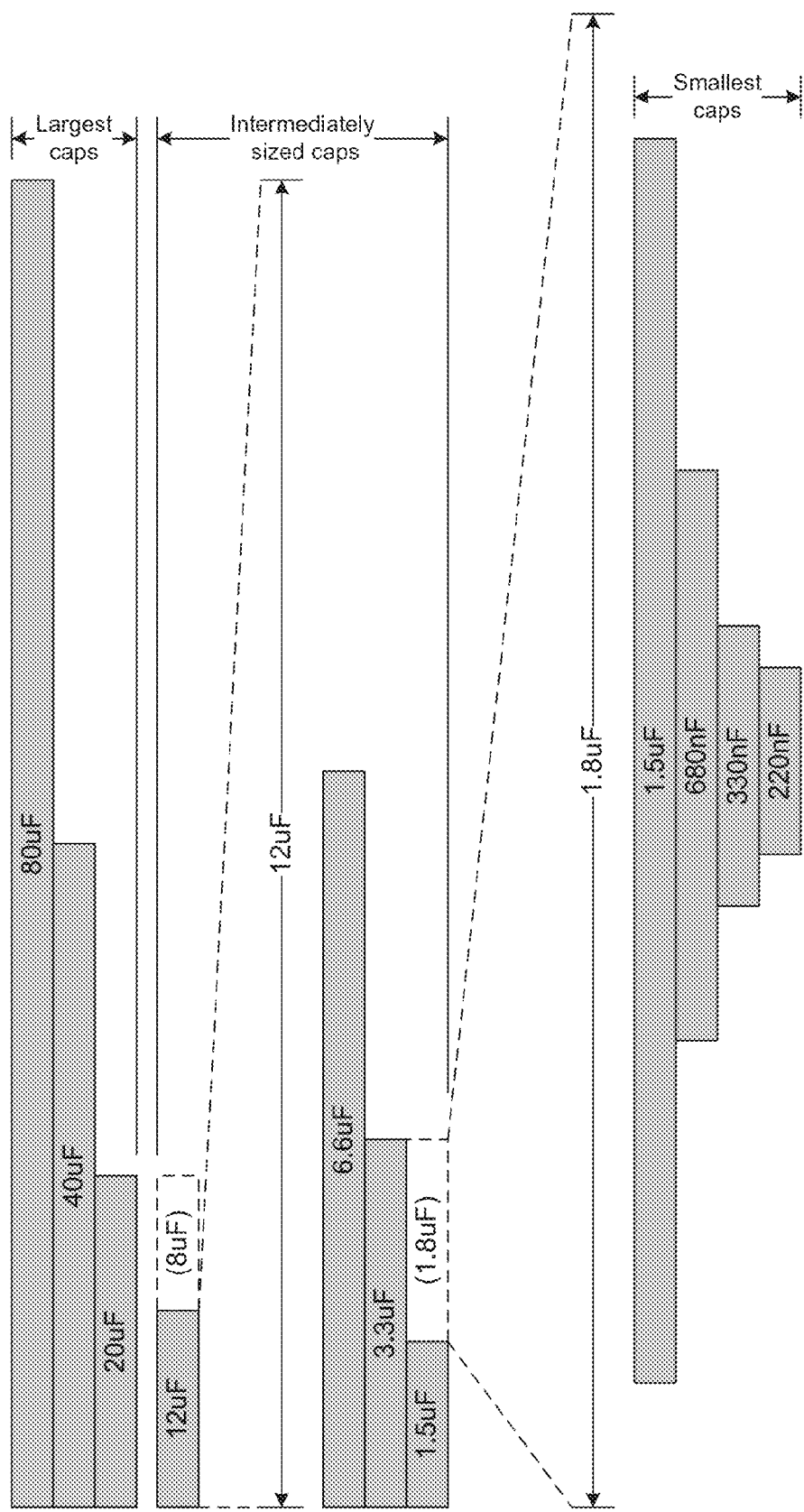
FIG. 13a illustrates the use of large capacitors.
Figure 13B:
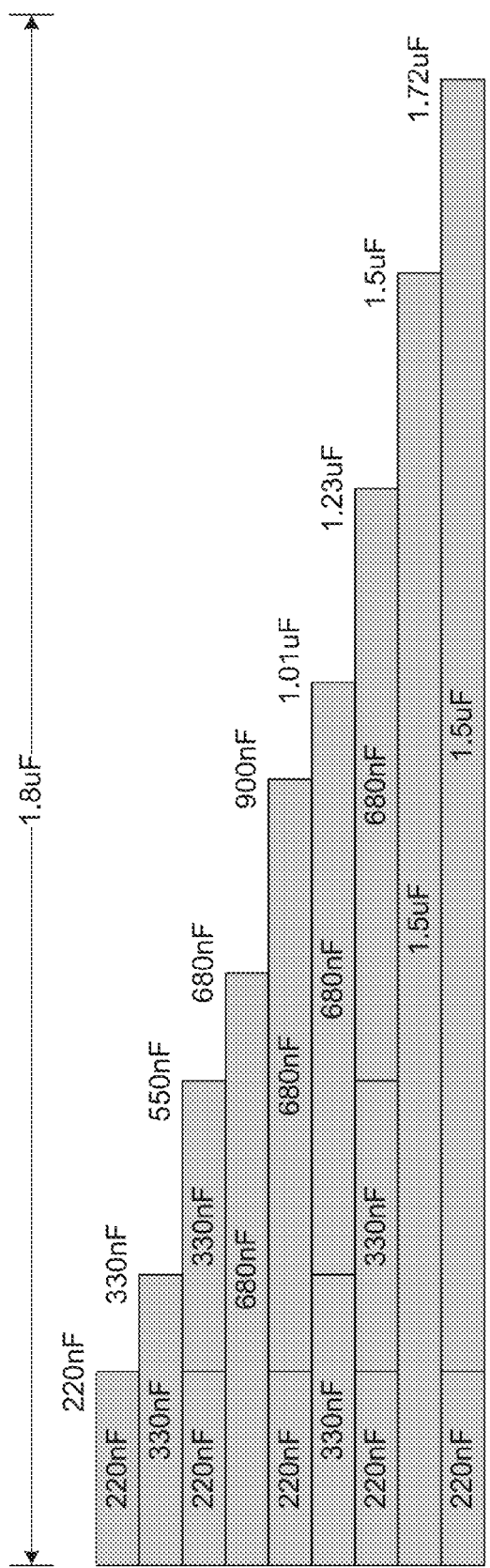
FIG. 13b illustrates the use of small capacitors.

FIGS. 13a and 13b conceptually illustrates how an array of switch capacitors with various "large" and "small" capacitance values provides a full range of capacitance values at sufficient granularity in a cost effective manner. FIG. 13a illustrates the use of large capacitors and FIG. 13b illustrates the use of small capacitors.

As illustrated in FIG. 13a, the capacitance values that are available to an example VAR control circuit includes 220 nF, 330 nF, 680 nF, 1.5 uF, 1.5 uF, 3.3 uF, 6.6 uF, 12 uF, 20 uF, 40 uF, and 80 uF (same as the those illustrated in FIG. 9). Among the largest capacitance values, the capacitance values are factors of power of two from each other. In this example set of capacitance values, the three largest capacitors are valued at 80 uF, 40 uF, and 20 uF. This facilitates an initial selection of capacitor values by binary decomposition. This also allows the VAR control to provide capacitance values at 20 uF increments up to 140 uF. Increments less than 20 uF will be provided by smaller capacitors in the set.

The next largest capacitance values include 12 uF, 6.6 uF, 3.3 uF, and 1.5 uF. These capacitance values are not exactly power of two from each other, but are chosen to be near power of two of each other such that the sum of all capacitor values smaller than a given capacitor exceeds that given capacitor value. For example, the sum of all capacitor values less than 12 uF is more than 12 uF (because 6.6 uF+3.3 uF+1.5 uF+1.5 uF+ . . . >12.9 uF), and sum of all capacitor values less than 6.6 uF is more than 6.6 uF (because 3.3 uF+1.5 uF+1.5 uF+680 nF+ . . . >6.98 uF). This intermediately sized group of capacitance values allows the VAR control to provide capacitance value at increment that is finer than 1.8 uF. Increments of capacitance value finer than 1.8 uF are provided by the smallest group of capacitors. In some embodiments, the largest capacitor in this intermediately sized group has a capacitance value that is smaller than the smallest capacitor in large capacitor group (where the capacitance values are factors of power of two from each other).

The smallest capacitance values include 1.5 uF (there are two 1.5 uF capacitors in this example, though this is not required), 680 nF, 300 nF, and 200 nF. These values are not chosen to be at or near power of two of each other. Rather, these values are chosen such that different combinations of these values can provide continuous fine grain increment between 0 and 1.8 uF. FIG. 13b illustrates the fine grain resolution of capacitance values provided by the different possible combinations of these smallest capacitors.

FIG. 13b illustrates all different possible combinations of the capacitance values 1.5 uF, 680 nF, 300 nF, and 200 nF. As illustrated, the possible combinations of these four capacitance values are 220 nF, 330 nF, 550 nF, 680 nF, 900 nF, 1.01 uF, 1.23 uF, 1.5 uF, and 1.72 uF. These smallest capacitors provide increments of 220 nF, 110 nF, 220 nF, 130 nF, 220 nF, 210 nF, 220 nF, 270 nF, and 220 nF (granularity no coarser than 270 nF) from 0 to 1.8 uF. In other words, with all 11 available capacitors from the 80 uF to 220 nF, the VAR control is able to provide capacitance values from 0 to more than 160 uF at resolution of 270 nF or finer. In some embodiments, the different combinations of the smallest capacitors are stored in a look-up table that is indexed by the total capacitance values of the different combinations so the system can look up a combination that yield the closest total capacitance rather than having to actually try every combination.

The selection of these capacitors is for satisfying the desired tolerance limit. But the selection is also driven by what is readily available in the market at reasonable cost. This method allows the VAR controller to provide power factor correction at sufficiently fine granularity without having to use only capacitors that are exact power of two factors, which can be costly or difficult to obtain.

Figure 14:
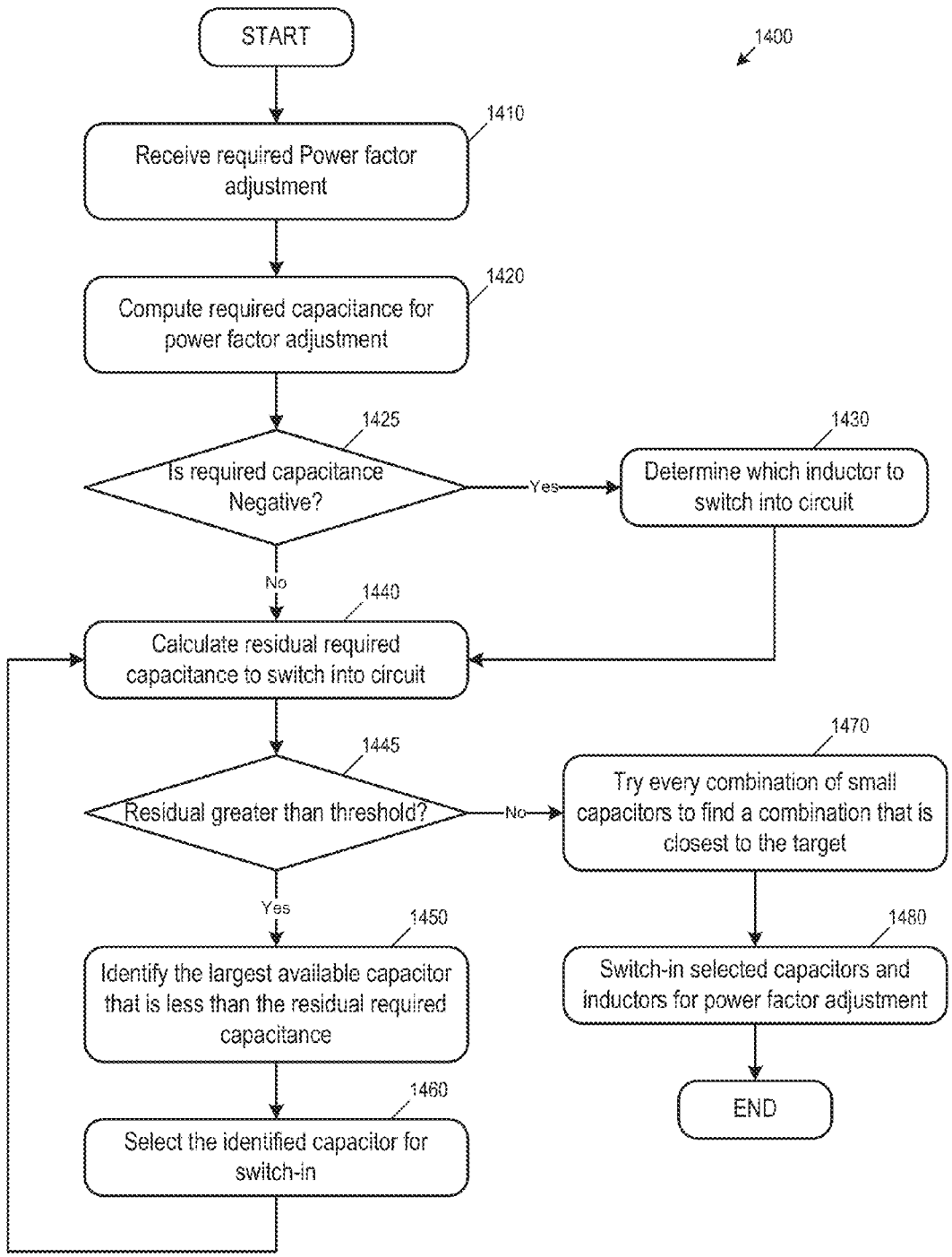
FIG. 14 conceptually illustrates a process for selecting reactive elements to switch-in or switch-out for the purpose of performing power factor correction.

For some embodiments, FIG. 14 conceptually illustrates a process 1400 for selecting reactive elements to switch-in or switch-out for the purpose of performing power factor correction or VAR control. The process 1400 is performed by a power generation system as part of the operation 860 of the process 800 in some embodiments. For some embodiments that perform VAR control in a multi-phase power generation system, the process starts after the system has determined the requisite power factor adjustment for a particular phase based on the total power output of that phase (e.g., by adding the power outputs of the individual micro-inverters of that phase) and the displacement power factor of that phase (e.g., by measuring the current and voltage of the injected power of that phase).

The process 1400 receives (at 1410) the requisite power factor adjustment. The process then computes (at 1420) the required capacitance for the requisite power factor adjustment. In other words, the process 1400 computes how much capacitance has to be switched in in order for the power factor of the system to match the grid requirement at the current power output level.

The process then determines (at 1425) whether the required capacitance value is a positive quantity or a negative quantity. This required capacitance value is a positive quantity if the phase of the current is lagging the phase of the voltage by more than the grid requirement, or if the phase of the current is leading the phase of the voltage by less than the grid requirement. Conversely, this required capacitance value is negative if the phase of the current is leading the phase of the voltage by more than the grid requirement, or if the phase of the current is lagging the phase of the voltage by less than the grid requirement. One can also view this from the point of the view of the power factor plot such as those illustrated in FIGS. 1 and 3. The required capacitance is positive when the power factor of the system is below the target power factor, and negative when the power factor of the system is above the target power factor. If the required capacitance value is a positive quantity, the process proceeds to 1440. If the required capacitance value is a negative quantity, the process proceeds to 1430.

At 1430, the process determines which inductor to switch into circuit. When the required capacitance value to be switched in is negative, some embodiments switch in inductors across the AC power output in order to achieve the necessary power factor correction. Since physical and cost constraints of inductors makes it cost prohibitive to achieve fine grain power factor correction by using inductors alone (inductors capable of handling the current produced by the power generation system is physically bulky), some embodiments switch in enough inductors to overshoot the target displacement power factor before using switch capacitors to achieve the target power factor with sufficient resolution. Once the process has determined which inductors to switch in, it proceeds to 1440 to calculate the residual required capacitance.

At 1440, the process calculates the residual required capacitance. Once some switch capacitors or inductors has been identified for switch-in, the process determines how much more capacitance has to be switched in to achieve the target power factor. This residual is referred to as residual required capacitance in some embodiments. Before any reactive elements in the VAR control has been identified for switch-in for the power factor correction, the residual required capacitance is initially set to the total required capacitance for power factor adjustment computed in operation 1420. In some embodiment, this quantity is always positive (if the required capacitance is negative, the process in operation 1430 would have already switched in enough inductance to overshoot the target power factor.)

The process then determines (1445) whether this residual required capacitance is greater than a threshold for small capacitances. This threshold determines whether the process should start trying different combinations of the remaining small capacitors to achieve the target power factor. In the example of FIGS. 13*a*-*b*, this threshold is 1.8 uF. In other words, the process would start trying different combinations of the remaining small capacitors 1.5 uF, 680 nF, 330 nF, 220 nF if the residual required capacitance is less than 1.8 uF. If the residual is less than the threshold, the process proceeds to 1470 to try those different combinations of small capacitors. If the residual is greater than this threshold, the process proceeds to 1450.

At 1450, the process identifies the largest available capacitor that is less than the residual required capacitance. A capacitor is "available" in this context if it has not been selected for switch-in. The process then selects (at 1460) the identified capacitor for switch-in before returning to 1440 to calculate the next residual required capacitance.

The process tries (at 1470) every combination of small capacitors to find a combination that produces a power factor adjustment that is the closest to the target power factor. In some embodiments, this operation is performed by looking up a table that stores all possible combinations of the small capacitors rather than actually try every possible combination. In some embodiments, the final power factor adjustment can overshoot the target power factor. After finding a suitable combination of smallest capacitors, the process switches (at 1480) in the selected capacitors and/or inductors across the AC output to implement the power factor adjustment. After implementing the power factor correction, the process 1400 ends.

Figure 15:
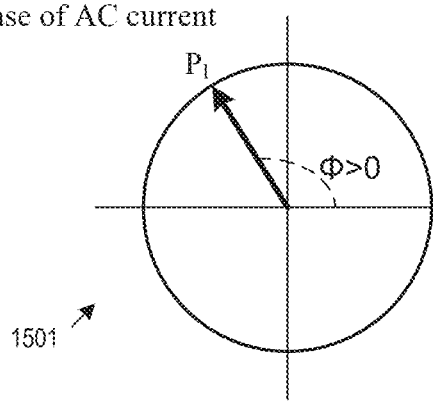
FIG. 15 illustrates power factor adjustment when the required power factor adjustment requires negative capacitance value.
Figure 15:
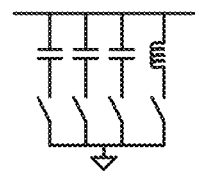
Figure 15:
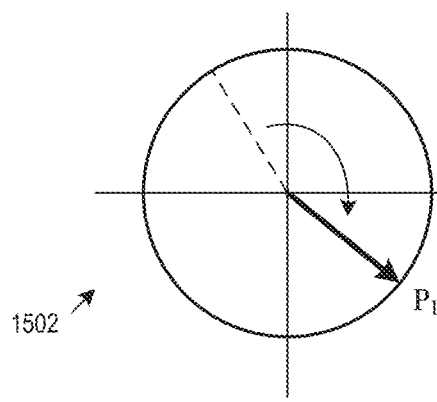
Figure 15:
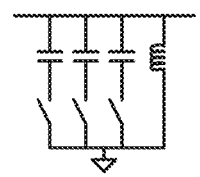
Figure 15:
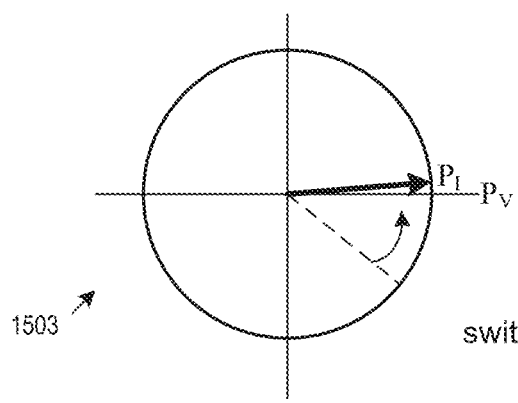
Figure 15:
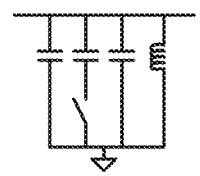
Figure 16:
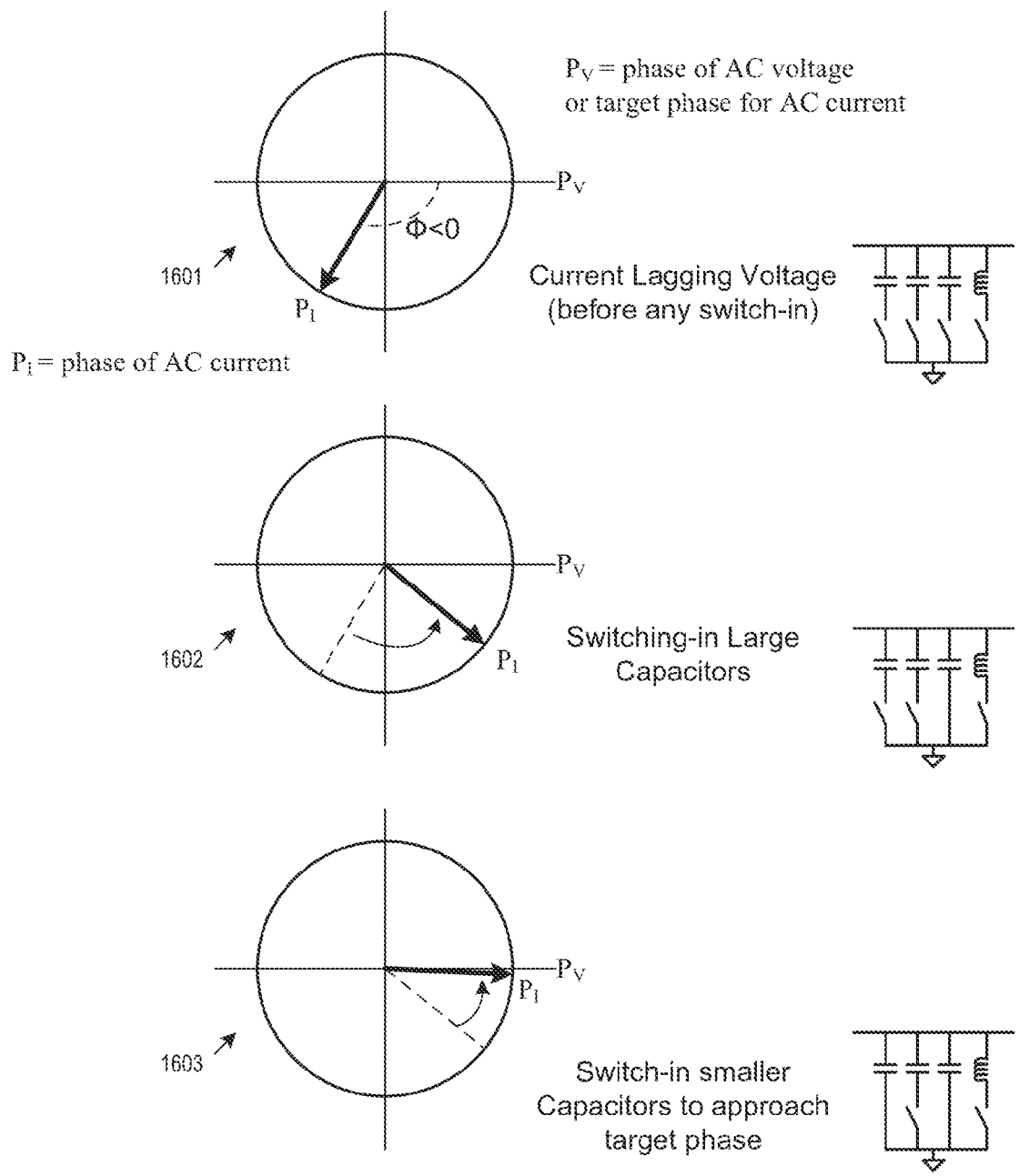
FIG. 16 illustrates power factor adjustment when the required power factor adjustment requires positive capacitance value.

FIGS. 15-16 graphically illustrate power factor adjustment performed by some embodiments. For purpose of simplicity, FIG. 15-16 illustrates when the target power factor is unity ($\Phi=0$ and $\cos(\Phi)=1.0$), i.e., when the current is neither over-excited or under excited. However, one of ordinary skill would understand that the target power factor need not be unity and the target phase of the current need not be the phase of the voltage. The power factor adjustment is illustrated by showing the phase difference between the phase of the current and the phase of the voltage (or the target phase of the current) and also by showing the operations of the switch reactive elements.

FIG. 15 illustrates power factor adjustment when the required power factor adjustment requires negative capacitance value (i.e., when the phase of the current leads the phase of the voltage by more than the required angle). FIG. 15 illustrates the power factor adjustment in three stages 1501-1503. Each stage shows a plot of the phases of the voltage and current and a diagram of the switchable reactive elements.

At the first stage 1501, no reactive element has been switched in, and the current is leading the voltage (i.e., over-excited). At the second stage 1502, the system has switched in enough inductors to over shoot the phase of the voltage (i.e., the target phase when target power factor is unity) such that the phase of the current actually lags the phase of the voltage (the target phase). At the third stage 1503, the system switches in capacitors to fine tune the result power factor adjustment to get the phase of the current as close to the phase of the voltage (the target phase) as possible.

FIG. 16 illustrates power factor adjustment when the required power factor adjustment requires positive capacitance value (i.e., when the phase of the current lags the phase of the voltage by more than the required angle). FIG. 16 illustrates the power factor adjustment in three stages 1601-1603. Each stage shows a plot of the phases of the voltage and current and a diagram of the switchable reactive elements.

At the first stage 1601, no reactive element has been switched in, and the current is lagging the voltage (i.e., under-excited). At the second stage 1602, the system has switched in some large capacitors without overshooting the phase of the voltage (i.e., the target phase when target power factor is unity). At the third stage 1603, the system switches in small capacitors to fine tune the result power factor adjustment to get the phase of the current as close to the phase of the voltage (the target phase) as possible.

III. System Control for the Multi-Phase System

As mentioned, a system controller controls the multi-phase power supply system. In some embodiments, the system controller is a gateway controller to the multi-phase power generation system, through which the user can monitor and control the operations of the system. In some embodiments, the system controller also coordinates the power generation operations between the different phases of the multi-phase system. In some embodiments, the system controller gathers power output readings from each of the micro-inverters in the system and performs balancing of power output level between the different phases. The VAR control of each phase then uses the balanced power output level to correct the power factor for that phase.

The system controller performs different roles in the VAR control operations in different embodiments. In some embodiments, the system controller receives the current and voltage measurements at the grid for all phases and performs VAR control directly for all phases by providing the switch drives directly to the switch reactive elements in VAR control modules of all phases. In some embodiments, the system controller provides the grid current and voltage measurements of the different phases to the VAR control modules of these different phases and let the micro-controllers in these VAR control modules produce the switch drives on their own. In some embodiments, the system controller does not participate in VAR control at all, but allow the VAR control module to obtain the grid measurements of current and voltage and perform VAR control on their own.

Figure 17:
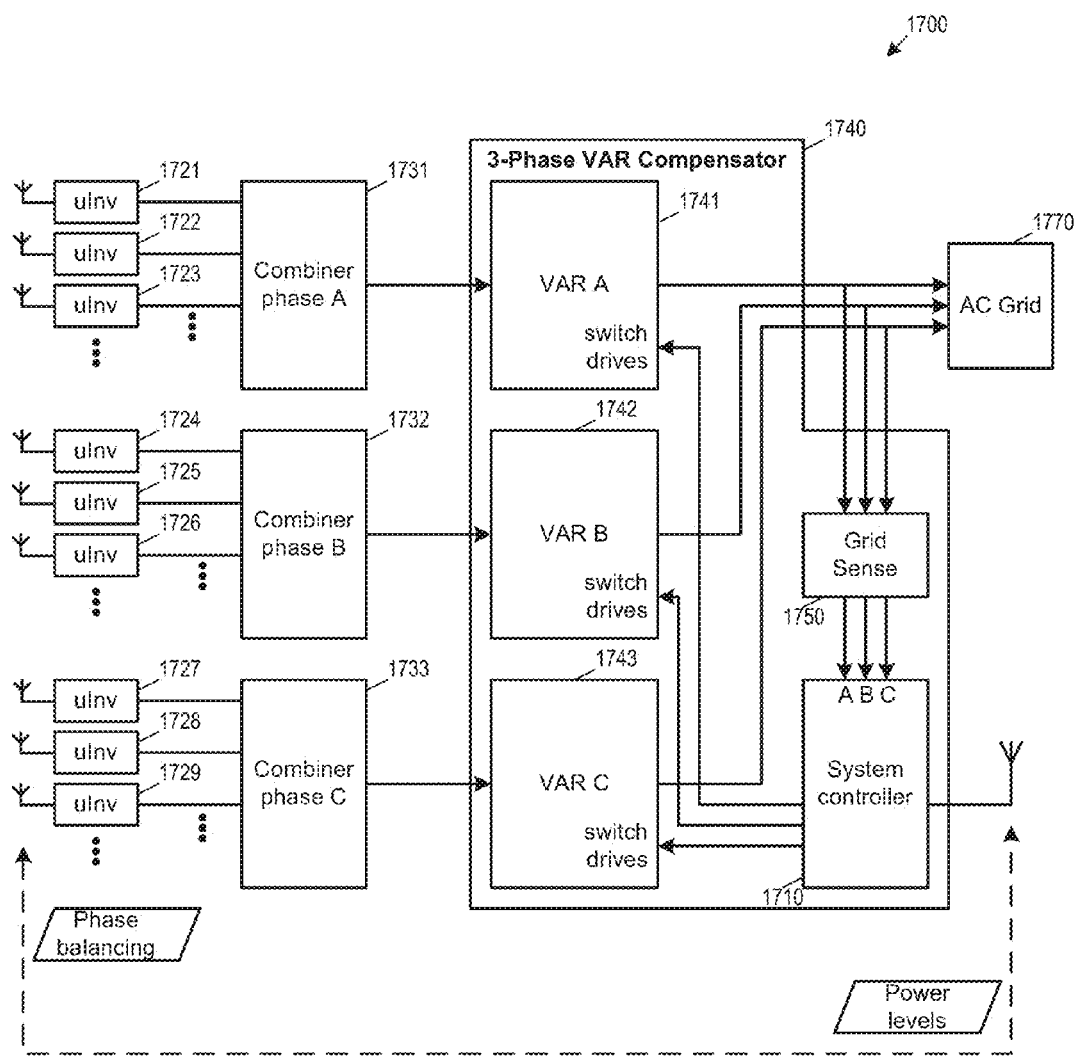
FIG. 17 illustrates a three phase power generation system in which a system controller generates the switch drives directly to each of the switch capacitors and inductors.

FIG. 17 illustrates a three-phase power generation system 1700 in which a system controller 1710 generates the switch drives directly to each of the switch capacitors and inductors. The three-phase power generation system 1700 includes the system controller 1710, micro-inverters 1721-1729, combiners 1731-1733, VAR controllers 1741-1743, a grid sensor 1750, and a three phase AC grid tie point 1770.

The AC power outputs of the micro-controllers 1721-1723 are combined by the combiner 1731 for phase A, and VAR controller 1741 performs power factor correction on the combined power for phase A and inject the VAR controlled AC power output for phase A into the grid tie point 1770. The AC power outputs of the micro-controllers 1724-1726 are combined by the combiner 1732 for phase B, and VAR controller 1742 performs power factor correction on the combined power for phase B and inject the VAR controlled AC power output for phase B into the grid tie point 1770. The AC power outputs of the micro-controllers 1727-1729 are combined by the combiner 1733 for phase C, and VAR controller 1743 performs power factor correction on the combined power for phase C and inject the VAR controlled AC power output for phase C into the grid tie point 1770.

The system controller 1710 is part of a three-phase VAR compensator unit 1740, which also encompasses the three VAR controllers 1741-1743. The system controller 1710 receives power output measurements from each of the micro-inverters 1721-1729 and sends messages to these micro-inverters to balance their power level. This communications can be wired communication (e.g., Power line communication or PLC) or wireless communication (e.g., ZigBee). The system controller 1710 also receives grid voltage and current measurement from the grid sensor 1750 and performs the power factor adjustment computation for all three phases based on the power output level of the three phases. The system controller then produces switch drive signals to each of the VAR controllers and control each individual switch capacitors and inductors. In some embodiments, the VAR controllers do not include their own micro-controllers when the switch drives are directly supplied by the system controller.

Figure 18:
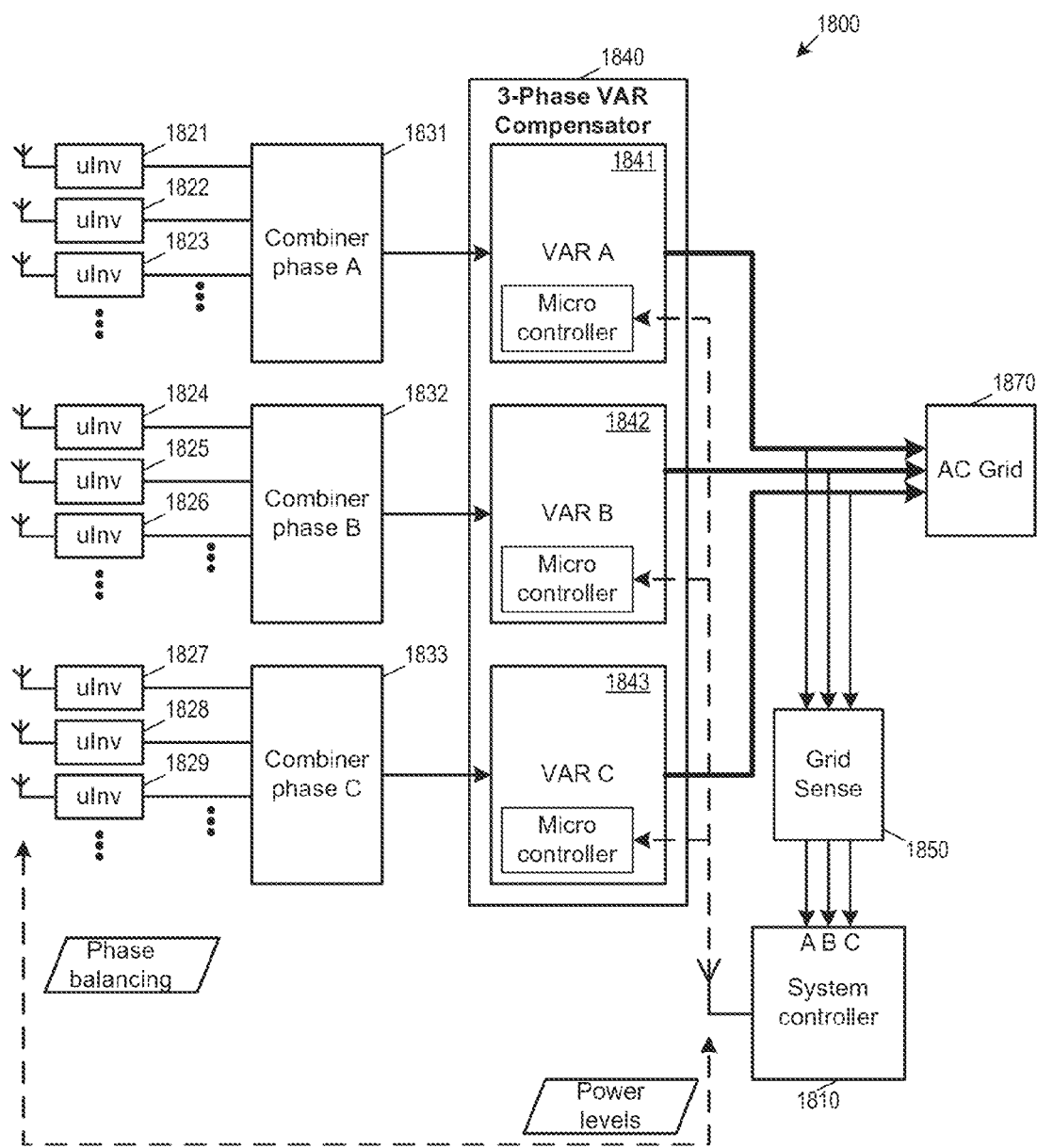
FIG. 18 illustrates a three phase power generation system in which a system controller provides grid current and voltage measurements of the different phases to the VAR control modules.

FIG. 18 illustrates a three phase power generation system 1800 in which a system controller 1810 provides grid current and voltage measurements of the different phases to the VAR control modules of these different phases and let the micro-controllers in these VAR control modules produce the switch drives. The three-phase power generation system 1800 includes the system controller 1810, micro-inverters 1821-1829, combiners 1831-1833, VAR controllers 1841-1843, a grid sensor 1850, and a three phase AC grid tie point 1870.

The AC power outputs of the micro-controllers 1821-1823 are combined by the combiner 1831 for phase A, and VAR controller 1841 performs power factor correction on the combined power for phase A and inject the VAR controlled AC power output for phase A into the grid tie point 1870. The AC power outputs of the micro-controllers 1824-1826 are combined by the combiner 1832 for phase B, and VAR controller 1842 performs power factor correction on the combined power for phase B and inject the VAR controlled AC power output for phase B into the grid tie point 1870. The AC power outputs of the micro-controllers 1827-1829 are combined by the combiner 1833 for phase C, and VAR controller 1843 performs power factor correction on the combined power for phase C and inject the VAR controlled AC power output for phase C into the grid tie point 1870.

Unlike the system controller 1710, the system controller 1810 is not integrated together with the VAR controllers 1841-1843, which are part of a 3-phase VAR compensator unit 1830. The system controller 1810 receives power output measurements from each of the micro-inverters 1821-1829 and sends messages to these micro-inverters to balance their power level. The system controller then sends the resulting power levels of the different phases to the VAR controllers 1841-1843. The system controller 1810 also receives grid voltage and current measurement from the grid sensor 1850 and relay these readings to VAR controllers 1841-1843, each of which includes a micro-controller for performing power factor adjustment computations and supplies the switch drive signals. In some embodiments, the system controller 1810, the VAR controller 1841-1843, and the micro-inverters 1821-1829 are all in a same communications network. This communications network can be a wired communications network (e.g., Power line communication or PLC) or wireless communications network (e.g., ZigBee).

Figure 19:
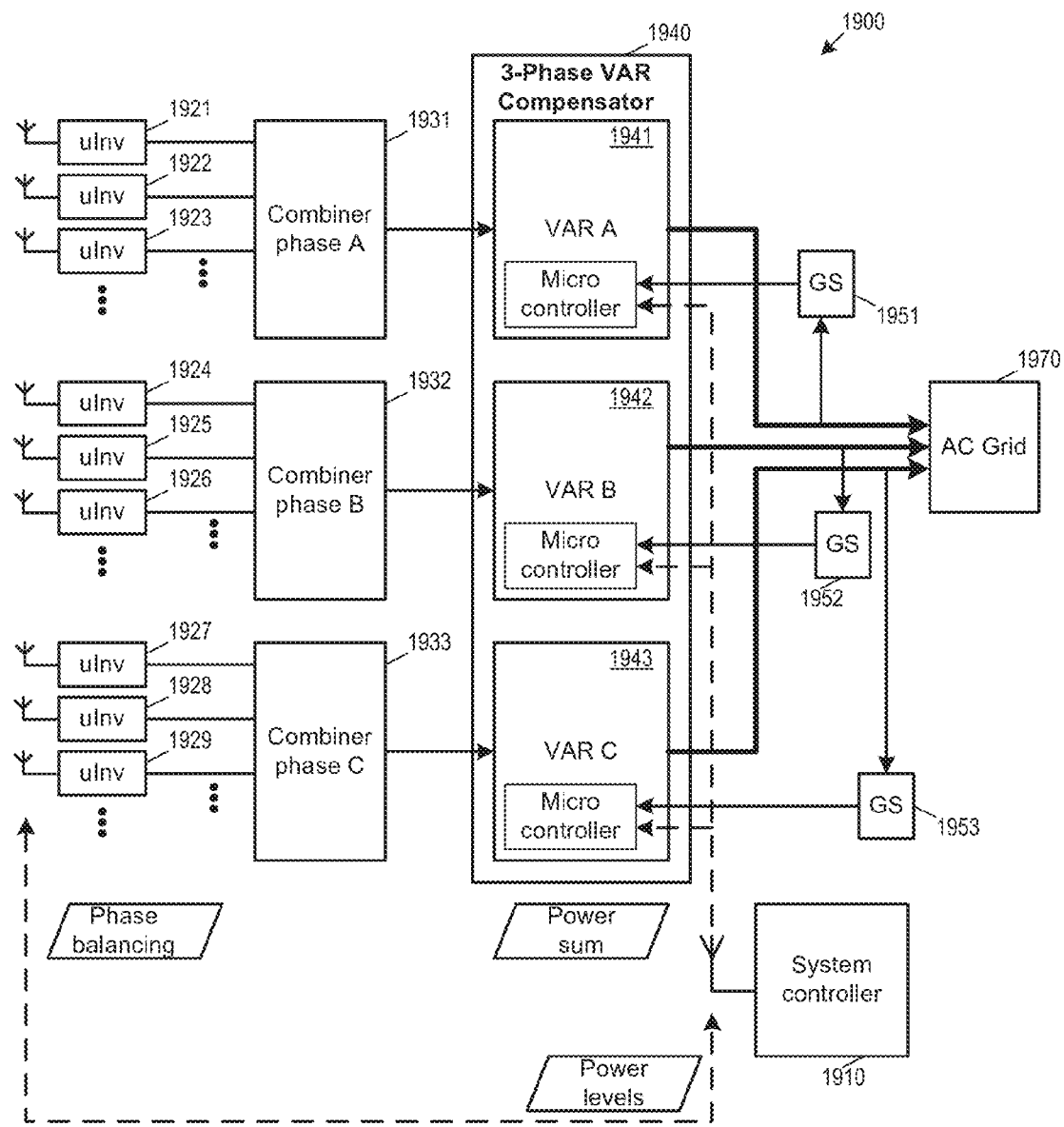
FIG. 19 illustrates a three-phase power generation system in which VAR control modules obtain grid measurements of current and voltage directly from grid sensors.

FIG. 19 illustrates a three-phase power generation system 1900 in which a system controller 1910 does not participate in VAR control directly, but allow the VAR control module to obtain the grid measurements of current and voltage and perform VAR control on their own. The three-phase power generation system 1900 includes the system controller 1910, micro-inverters 1921-1929, combiners 1931-1933, VAR controllers 1941-1943, grid sensors 1951-1953, and a three phase AC grid tie point 1970.

The AC power outputs of the micro-controllers 1921-1923 are combined by the combiner 1931 for phase A, and VAR controller 1941 performs power factor correction on the combined power for phase A and inject the VAR controlled AC power output for phase A into the grid tie point 1970. The AC power outputs of the micro-controllers 1924-1926 are combined by the combiner 1932 for phase B, and VAR controller 1942 performs power factor correction on the combined power for phase B and inject the VAR controlled AC power output for phase B into the grid tie point 1970. The AC power outputs of the micro-controllers 1927-1929 are combined by the combiner 1933 for phase C, and VAR controller 1943 performs power factor correction on the combined power for phase C and inject the VAR controlled AC power output for phase C into the grid tie point 1970.

Unlike the system controller 1810, the system controller 1910 does not receive voltage and current measurement from the grid sensors. Instead, the grid sensor readings are obtained directly by the VAR controllers. In some embodiments, the grid sensors 1951-1953 are integrated together with the VAR controllers. The system controller 1910 receives power output measurements from each of the micro-inverters 1921-1929 and sends messages to these micro-inverters to balance their power level. The system controller then sends the resulting power levels of the different phases to the VAR controllers 1841-1843. Each VAR controller, based on the total power output level for its phase received from the system controller, performs power factor adjustment computation in its micro-controller and supplies the switch drives to the its own set of switch capacitors and switch inductors.

In some embodiments, the system controller 1910, the VAR controller 1941-1943, and the micro-inverters 1921-1929 are all in a same communications network. This communications network can be a wired communications network (e.g., Power line communication or PLC) or wireless communications network (e.g., ZigBee).

Figure 20:
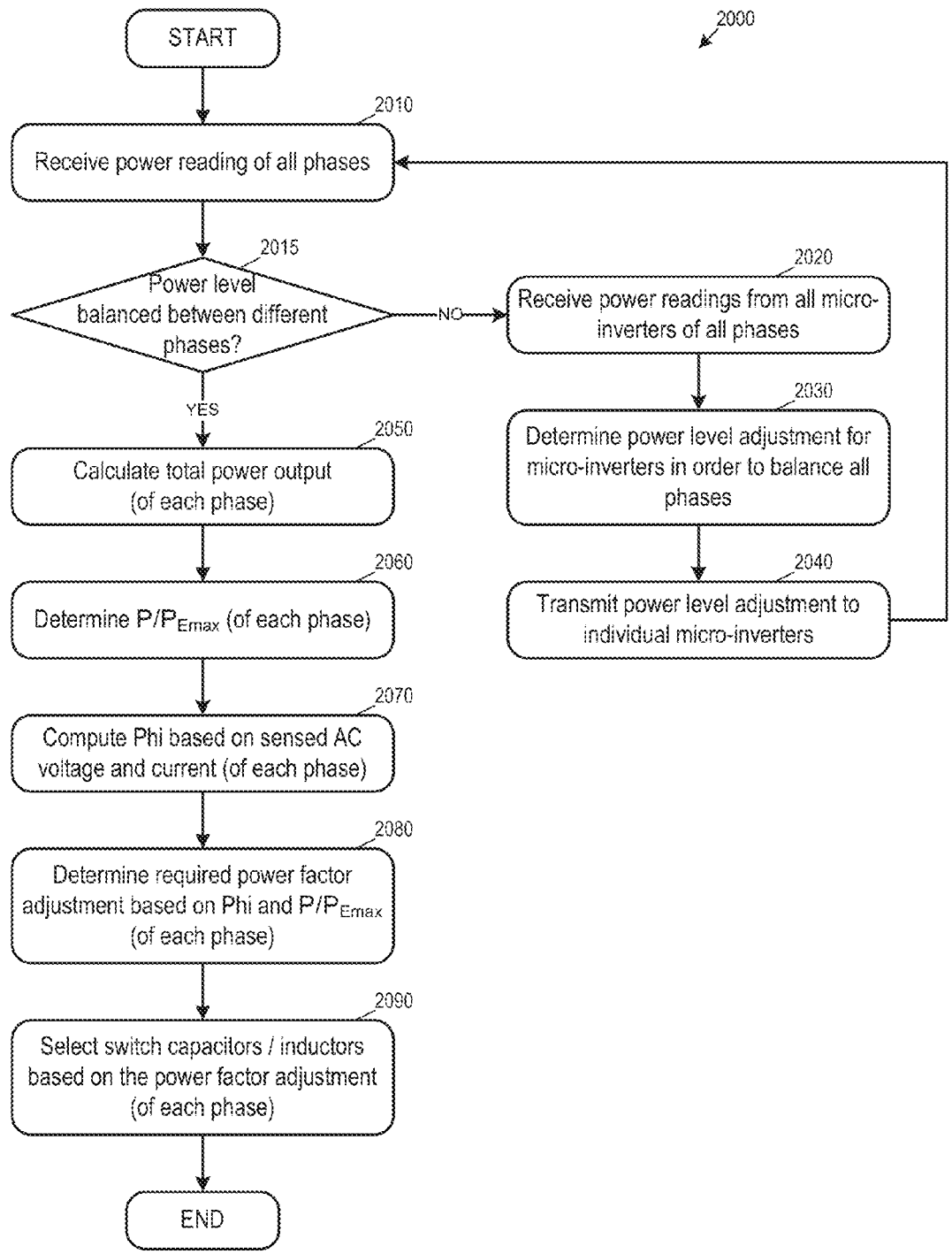
FIG. 20 conceptually illustrates a process for a multi-phase system that performs both phase balancing and VAR control.

FIG. 20 conceptually illustrates a process 2000 for a multi-phase system that performs both phase balancing and VAR control. In some embodiments, this process starts whenever it is necessary to check power output levels of the system to see if they are balanced and if the displacement power factor is in compliance with grid requirement. This may occur, for example, when the intensity of sun light has changed due to different times of the day, or if a portion of the solar panels become shaded.

The process receives (at 2010) power readings for all phases. In some embodiments, the system polls each micro-inverter for its power output level, and then compute the power output levels of each phase by summing the output levels of all micro-inverters in that phase. In some embodiments, the process uses the voltage and current measurements injected into the grid to determine the power output level of each phase.

The process next determines (at 2015) whether the power levels of the different phases are balanced. If the power levels are balanced, the process proceeds to 2050. If the power levels between the phases are not balanced, the process proceeds to 2020.

At 2020, the process receives the power readings from all micro-inverters of all phases. In some embodiments, this operation is performed only if the process does not already have the power readings of individual micro-inverters. The process then computes (at 2030) the power level adjustment needed for each micro-inverter in order to balance three different phases. In some embodiments, the process determines a new power output level for some of the micro-inverters (either to increase or decrease the output level). In some embodiments, the process selects one or more micro-inverters to shut-down or turn-on in order to balance power output level of the three phases. The process then transmits (at 2040) those power level adjustments to the individual micro-inverters and return to 2010 to once again receive power reading of all phases.

Once the power levels between the phases are balanced, the process calculates (at 2050) an updated total power output of each phase. Based on this updated, balanced total power output, the process computes (at 2060) the power level ratio ($P/P_{Emax}$) of each phase by dividing the updated total power output of the phase by the rated maximum power level. The process then proceeds to 2070 to perform VAR control/power factor adjustment for each phase.

The process computes (at 2070) the phase difference ($\varphi$) between the measured voltage and the measured current from the grid sensor and determines (at 2080) the required power factor adjustment for each phase with respect to the grid requirement based on the computed $\Phi$ and $P/P_{Emax}$. Based on the computed require power factor adjustment for each phase, the process selects (at 2090) a set of reactive elements for switch-in for the purpose of VAR control for each phase. The process 2000 then ends.

In order to comply with different regional requirements, some embodiments provide ride-through abilities during black-out or brown-out. In some embodiments, the system would switch-in all capacitors when it detects a sag in voltage, which indicates brown-out or black-out condition. In some embodiments, the system would keep the capacitors switched in for half of an AC cycle or for any period of time.

As previously mentioned, although some preferred implementations of the technique are employed in a solar photovoltaic power conversion system, in principle similar techniques may also be employed in other renewable power generation systems, in particular where multiple, relatively small power sources are connected together to provide power to the grid.

In some embodiments, the system controller may be implemented in hardware, or in software for example on a microcontroller or digital signal processor, or in a combination of the two. Thus the invention also provides processor control code on a physical data carrier such as a disk, configured to implement the system controller. This code (and/or data) may comprise code for controlling a processor or code for setting up or controlling an ASIC, or a FPGA, or code for a hardware description language.

As the skilled person will appreciate, the functions of the system controller may either be implemented at one point in the system or maybe distributed between a plurality of coupled components in communication with one another. For example the functions of the system controller may be shared amongst the inverter modules and/or VAR controllers.

IV. Electronic System

Figure 21:
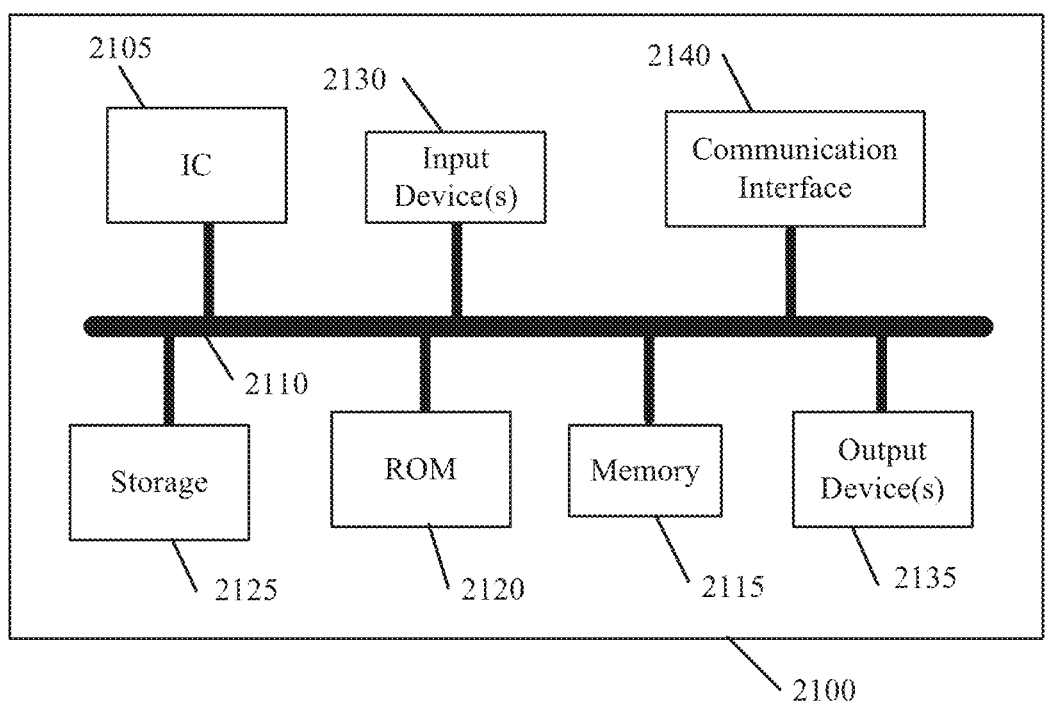
FIG. 21 conceptually illustrates an example of a computing system that is used to implement some embodiments of the invention.

FIG. 21 conceptually illustrates an example of a computing system 2100 that is used to implement some embodiments of the invention. The system 2100 can be a stand-alone computing or communication device, or it can be part of another electronic device. As shown in FIG. 21, the computing system 2100 includes an IC 2105, a bus 2110, a system memory 2115, a read-only memory 2120, a storage device 2125, input device(s) 2130, output device(s) 2135, and a communication interface 2140. The IC 2105 in some embodiments implements the system controller of the multi-phase power generation system. The IC 2105 in some embodiments implements the controllers inside the VAR controller modules and/or micro-inverters.

The bus 2110 collectively represents all system, peripheral, and chipset interconnects (including bus and non-bus interconnect structures) that communicatively connect the numerous internal devices of the system 2100. For instance, the bus 2110 communicatively connects the IC 2105 with the read-only memory 2120, the system memory 2115, and the permanent storage device 2125. The bus 2110 may be any of several types of bus structures including a memory bus or memory controller, a peripheral bus, and a local bus using any of a variety of conventional bus architectures. For instance, the bus 2110 architecture may include any of the following standard architectures: PCI, PCI-Express, VESA, AGP, Microchannel, ISA and EISA, to name a few.

From these various memory units, the IC 2105 receives data for processing. When the IC 2105 has a processor, the IC also retrieves, from the various memory units, instructions to execute. The read-only-memory (ROM) 2120 stores static data and instructions that are needed by the IC 2105 and other modules of the system 2100.

Some embodiments of the invention use a mass-storage device (such as a magnetic disk to read from or write to a removable disk, or an optical disk for reading a CD-ROM disk or to read from or write to other optical media) as the permanent storage device 2125. Other embodiments use a removable storage device (such as a flash memory card or memory stick) as the permanent storage device 2125. The drives and their associated computer-readable media provide non-volatile storage of data, data structures, computer-executable instructions, etc. for the system 2100. Although the description of computer-readable media above refers to a hard disk, a removable magnetic disk, and a CD, it should be appreciated by those skilled in the art that other types of media which are readable by a computer, such as magnetic cassettes, digital video disks, and the like, may also be used in the exemplary operating environment.

Like the storage device 2125, the system memory 2115 is a read-and-write memory device. However, unlike storage device 2125, the system memory is a volatile read-and-write memory, such as a random access memory. Typically, system memory 2115 may be found in the form of random access memory (RAM) modules such as SDRAM, DDR, RDRAM, and DDR-2. The system memory stores some of the sets of instructions and data that the processor needs at runtime.

The bus 2110 also connects to the input and output devices 2130 and 2135. The input devices 2130 enable the user to enter information into the system 2100. The input devices 2130 can include touch-sensitive screens, keys, buttons, keyboards, cursor-controllers, touch screen, joystick, scanner, microphone, etc. The output devices 2135 display the output of the system 2100. The output devices 2135 include printers and display devices, such as cathode ray tubes (CRT), liquid crystal displays (LCD), organic light emitting diodes (OLED), plasma, projection, etc.

Finally, as shown in FIG. 21, bus 2110 also couples system 2100 to other devices through a communication interface 2140. Examples of the communication interface 2140 include network adapters that connect to a network of computers, or wired or wireless transceivers for communicating with other devices. Through the communication interface 2140, the system 2100 can be part of a network of computers (such as a local area network ("LAN"), a wide area network ("WAN"), or an Intranet) or a network of networks (such as the Internet). The communication interface 2140 may provide such connection using wireless techniques, including digital cellular telephone connection, Cellular Digital Packet Data (CDPD) connection, digital satellite data connection, or the like.

While the invention has been described with reference to numerous specific details, one of ordinary skill in the art will recognize that the invention can be embodied in other specific forms without departing from the spirit of the invention. For example, many of the storage circuits can be used in ICs other than the ones described above, including ICs that do not include configurable circuits (e.g., pure ASICs, processors, etc.). Thus, one of ordinary skill in the art would understand that the invention is not to be limited by the foregoing illustrative details, but rather is to be defined by the appended claims.

What is claimed is:

1. A multi-phase power generation system comprising:
a first set of inverters for converting DC power into AC power for a first phase of the multi-phase power generation system;
a first AC current combiner that combines power outputs from the first set of inverters into a first combined AC power output for the first phase of the multi-phase power generation system;
a first reactive power compensator comprising a first set of reactive elements, each reactive element of the first set of reactive elements switchable to be connected to the first combined AC power output for performing power factor adjustment for the first phase of the multi-phase power generation system;
a second set of inverters for converting DC power into AC power for a second phase of the multi-phase power generation system;
a second AC current combiner that combines power outputs from the second set of inverters into a second combined AC power output for the second phase of the multi-phase power generation system;
a second reactive power compensator comprising a second set of reactive elements, each reactive element of the second set of reactive elements switchable to be connected to the second combined AC power output for performing power factor adjustment for the second phase of the multi-phase power generation system; and
a system controller for balancing the AC power output between at least the first and the second phases of the multi-phase power generation system and for:
(1) selecting each reactive element of the first set of reactive elements to be connected to the first combined AC power output for the first phase by determining a difference between a displacement power factor of the first phase and a required power factor for the first phase, wherein the displacement power factor is computed from current and voltage measurements from the first combined AC power output; and
(2) selecting each reactive element of the second set of reactive elements to be connected to the second combined AC power output for the second phase by determining a difference between a displacement power factor of the second phase and a required power factor for the second phase, wherein the displacement power factor is computed from current and voltage measurements from the second combined AC power output.

2. The multi-phase power generation system of claim 1, wherein the first set of reactive elements comprises a plurality of capacitors and a plurality of inductors.

3. The multi-phase power generation system of claim 1, wherein each inverter of the first set of inverters is a micro-inverter for converting DC power from photovoltaic (PV) cells from one solar panel.

4. The multi-phase power generation system of claim 1, wherein each inverter of the first set of inverters includes switchable reactive elements for jointly performing the power factor adjustment.

5. The multi-phase power generation system of claim 1, wherein the power factor adjustment for the first phase is based on a power output of the first phase after the system controller has balanced the power output between at least the first and the second phases of the multi-phase power generation system.

6. The multi-phase power generation system of claim 1, wherein the power factor adjustment for the first phase is based on a required power factor for the first phase at a power level ratio computed from a power output level of the first phase relative to a rated maximum power output for the first phase.

7. The multi-phase power generation system of claim 6, wherein the first combined AC power output for the first phase is based on power output levels collected from the first set of inverters that produce AC power for the first phase.

8. The multi-phase power generation system of claim 1, wherein the first reactive power compensator comprises a micro-controller for generating a set of switch drives for the first set of reactive elements.

9. The multi-phase power generation system of claim 8, wherein the micro-controller of the first reactive power compensator is in a communications network with the first set of inverters.

10. The multi-phase power generation system of claim 9, wherein the communications network comprises a gateway controller for monitoring and controlling the multi-phase power generation system.

11. The multi-phase power generation system of claim 10, wherein the gateway controller balances the AC power outputs of the at least the first and the second phase of the multi-phase power generation system.

12. A method of compensating reactive power by a multi-phase power generation system, the method comprising:
combining AC power outputs generated by a first set of inverters for a first phase of the multi-phase power generation system into a first combined AC power output;
receiving a first current measurement and a first voltage measurement for the first combined AC power output that is being injected into a grid mains;
selecting a first reactive element from a first set of reactive elements to be switched on in parallel with the first combined AC power output based on the first current measurement and the first voltage measurement;
combining AC power outputs generated by a second set of inverters for a second phase of the multi-phase power generation system into a second combined AC power output;
receiving a second current measurement and a second voltage measurement for the second combined AC power output that is being injected into a grid mains;
selecting a second reactive element from a second set of reactive elements to be switched on in parallel with the second combined AC power output based on the second current measurement and the second voltage measurement;
balancing the first combined AC power output for the first phase with the combined AC power outputs from the second phase of the multi-phase power generation system by controlling the AC power outputs of the first set of inverters and the second set of inverters;
wherein the selecting the first reactive element comprises determining a difference between a first displacement power factor of the first phase and a first required power factor for the first phase, and wherein the first displacement power factor is computed from the first current measurement and the first voltage measurement; and
wherein the selecting the second reactive element comprises determining a difference between a second displacement power factor of the second phase and a second required power factor for the second phase, and wherein the second displacement power factor is computed from the second current measurement and the second voltage measurement.

13. The method of claim 12, wherein the set of reactive elements comprises a plurality of capacitors and a plurality of inductors.

14. The method of claim 12, wherein each inverter of the first set of inverters is a micro-inverter for converting DC power from photovoltaic (PV) cells from one solar panel.

15. The method of claim 12, wherein the selecting of the reactive element is further based on a power output level of the first phase after the balancing.

16. The method of claim 12, wherein the selecting of the reactive element comprises computing a power level ratio based on a power output level of the first phase relative to a rated maximum power output for the first phase.

17. The method of claim 16, wherein computing the power output level of the first phase comprises collecting power output levels from inverters that produce the AC power for the first phase.

18. The method of claim 16, wherein the selecting of the reactive element further comprises determining a required power factor at the computed power level ratio.

* * * * *